US012267093B2

(12) United States Patent
Gutman et al.

(10) Patent No.: US 12,267,093 B2
(45) Date of Patent: Apr. 1, 2025

(54) ANALOG FRONT END LINEARIZATION

(71) Applicant: QUALCOMM Incorporated, San Diego, CA (US)

(72) Inventors: Igor Gutman, Hod HaSharon (IL); Ajay Devadatta Kanetkar, San Diego, CA (US); Zhaole Xiao, San Diego, CA (US); Juergen Cezanne, Ocean Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/333,411

(22) Filed: Jun. 12, 2023

(65) Prior Publication Data

US 2024/0413848 A1 Dec. 12, 2024

(51) Int. Cl.
*H04B 1/10* (2006.01)
*H04B 1/04* (2006.01)

(52) U.S. Cl.
CPC ............. *H04B 1/0475* (2013.01); *H04B 1/10* (2013.01); *H04B 2001/0433* (2013.01)

(58) Field of Classification Search
CPC . H04B 1/10; H04B 1/109; H04B 1/12; H04B 1/123; H04B 1/1027; H04B 10/697
See application file for complete search history.

(56) References Cited

U.S. PATENT DOCUMENTS

| 6,107,878 | A * | 8/2000 | Black | H04B 1/109 |
| | | | | 330/133 |
| 11,038,739 | B1 * | 6/2021 | Landis | H04B 1/1027 |
| 11,515,953 | B1 * | 11/2022 | Gutman | H04B 17/24 |
| 2003/0016741 | A1 * | 1/2003 | Sasson | H04L 27/38 |
| | | | | 375/229 |
| 2011/0103455 | A1 * | 5/2011 | Forrester | H04L 25/03006 |
| | | | | 375/232 |

(Continued)

OTHER PUBLICATIONS

Ngoc-Anh Vu et al. "Adaptive Distortion Inversion Technique for LNA's Nonlinearity Compensation in Direct RF Digitization", Dec. 2019, 2019 International Conference on Advanced Technologies for Communications (ATC), pp. 117-122. (Year: 2019).*

(Continued)

*Primary Examiner* — Sophia Vlahos
(74) *Attorney, Agent, or Firm* — Holland & Hart LLP

(57) ABSTRACT

Methods, systems, and devices for wireless communication are described. A user equipment (UE) may transmit a first message indicating a capability to linearize a digital signal outputted by an analog front end of the UE, the digital signal being associated with a first transmission. The UE may receive the first transmission, the first transmission being associated with a gain state comprising a set of configurations associated with a plurality of amplifiers at the UE, and the UE may linearize the digital signal associated with the first transmission based at least in part on the gain state, where linearizing the digital signal comprises obtaining an output voltage value corresponding to an input voltage value associated with the analog front end. In some examples, the UE may obtain an output voltage value from a lookup table (LUT) of a set of LUTs configured to the UE or generated by the UE.

30 Claims, 19 Drawing Sheets

(56) References Cited

U.S. PATENT DOCUMENTS

| | | | |
|---|---|---|---|
| 2015/0358055 A1* | 12/2015 | Molisch | H04B 7/0413 |
| | | | 370/329 |
| 2020/0092153 A1 | 3/2020 | Sarkas et al. | |
| 2021/0344367 A1* | 11/2021 | Wolf | H04W 8/24 |
| 2021/0367686 A1 | 11/2021 | Gutman et al. | |
| 2021/0409128 A1* | 12/2021 | Raghavan | H04B 7/0617 |
| 2022/0038229 A1* | 2/2022 | Levy | H04B 1/0475 |
| 2023/0164018 A1 | 5/2023 | Malik et al. | |
| 2024/0243838 A1* | 7/2024 | Farhadi | H04B 1/0475 |

OTHER PUBLICATIONS

Ericsson: "Analysis of Issues Related to Self-interference and Co-channel CLI", 3GPP TSG-RAN WG4 #104, R4-2212620, Electronic meeting, 3rd Generation Partnership Project, Mobile Competence Centre, 650, Route Des Lucioles, F-06921 Sophia-Antipolis Cedex, France, vol. Ran WG4, No. Electronic Meeting, Aug. 15, 2022-Aug. 26, 2022, Aug. 10, 2022, XP052281330, 45 Pages, Figure 14, Section 2.2.3.2.

Partial International Search Report—PCT/US2024/030990—ISA/EPO—Sep. 24, 2024.

Umoh I., et al., "Digital Post-Distortion Linearization of Wideband Wireless Receiver Nonlinearity", IEEE, 2014 IEEE 57th International Midwest Symposium on Circuits and Systems, Aug. 3-6, 2014, pp. 431-434.

Zhang H., et al., "Linearization Techniques for CMOS Low Noise Amplifiers: A Tutorial", IEEE Transactions on Circuits and Systems I, Regular Papers, IEEE, US, vol. 58, No. 1, Jan. 1, 2011, Published on Aug. 23, 2010, pp. 22-36, XP011340986.

International Search Report and Written Opinion—PCT/US2024/030990—ISA/EPO—Jan. 3, 2025.

\* cited by examiner

ANALOG FRONT END LINEARIZATION

FIELD OF TECHNOLOGY

The following relates to wireless communication, including analog front end linearization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support analog front end linearization. For example, the described techniques provide for a UE to transmit a first message indicating a capability to linearize a digital signal outputted by a receiving analog front end of the UE, the digital signal being associated with a first transmission. The UE may receive the first transmission, the first transmission being associated with a gain state of the receiving analog front end comprising a set of configurations associated with a plurality of amplifiers at the UE, and the UE may linearize the digital signal associated with the first transmission based at least in part on the gain state, where linearizing the digital signal comprises obtaining an output voltage value corresponding to an input voltage value associated with the analog front end. In some examples, the UE may obtain an output voltage value from a lookup table (LUT) of a set of LUTs configured to the UE or generated by the UE.

A method for wireless communications by a UE is described. The method may include transmitting a first message indicating a capability to linearize a digital signal outputted by a receiving analog front end of the UE, the digital signal being associated with a first transmission, receiving the first transmission, the first transmission being associated with a gain state of the receiving analog front end, the gain state including a set of configurations associated with a set of multiple amplifiers at the UE, and linearizing the digital signal associated with the first transmission based on the gain state, where linearizing the digital signal includes obtaining an output voltage value corresponding to an input voltage value associated with the receiving analog front end.

A UE for wireless communications is described. The UE may include one or more memories and one or more processors coupled with the one or more memories. The one or more processors may be individually or collectively configured to transmit a first message indicating a capability to linearize a digital signal outputted by a receiving analog front end of the UE, the digital signal being associated with a first transmission, receive the first transmission, the first transmission being associated with a gain state of the receiving analog front end, the gain state including a set of configurations associated with a set of multiple amplifiers at the UE, and linearize the digital signal associated with the first transmission based on the gain state, where linearizing the digital signal includes obtaining an output voltage value corresponding to an input voltage value associated with the receiving analog front end.

Another UE for wireless communications is described. The UE may include means for transmitting a first message indicating a capability to linearize a digital signal outputted by a receiving analog front end of the UE, the digital signal being associated with a first transmission, means for receiving the first transmission, the first transmission being associated with a gain state of the receiving analog front end, the gain state including a set of configurations associated with a set of multiple amplifiers at the UE, and means for linearizing the digital signal associated with the first transmission based on the gain state, where linearizing the digital signal includes obtaining an output voltage value corresponding to an input voltage value associated with the receiving analog front end.

A non-transitory computer-readable medium storing code is described. The code may include instructions executable by a processor to transmit a first message indicating a capability to linearize a digital signal outputted by a receiving analog front end of the UE, the digital signal being associated with a first transmission, receive the first transmission, the first transmission being associated with a gain state of the receiving analog front end, the gain state including a set of configurations associated with a set of multiple amplifiers at the UE, and linearize the digital signal associated with the first transmission based on the gain state, where linearizing the digital signal includes obtaining an output voltage value corresponding to an input voltage value associated with the receiving analog front end.

In some examples of the method, UEs, and non-transitory computer-readable medium described herein, linearizing the digital signal may include operations, features, means, or instructions for obtaining the output voltage value corresponding to the input voltage value based on a first lookup table of a set of lookup tables, the first lookup table being associated with the gain state.

In some examples of the method. UEs, and non-transitory computer-readable medium described herein, obtaining the input voltage value may include operations, features, means, or instructions for obtaining the input voltage value from the first lookup table based on a signal-to-noise ratio associated with a noise figure corresponding to the digital signal.

Some examples of the method, UEs, and non-transitory computer-readable medium described herein may further include operations, features, means, or instructions for receiving a second message indicating a frequency domain allocation for the first transmission based on transmitting the first message, where the second message indicates the UE to linearize the digital signal.

Some examples of the method, UEs, and non-transitory computer-readable medium described herein may further include operations, features, means, or instructions for transmitting a third message indicating a capability to mitigate a blocking frequency band based on linearizing the digital signal.

Some examples of the method, UEs, and non-transitory computer-readable medium described herein may further include operations, features, means, or instructions for receiving a fourth message indicating a frequency domain allocation that may be based on the third message, where the frequency domain allocation indicates at least one frequency band adjacent to the blocking frequency band.

Some examples of the method, UEs, and non-transitory computer-readable medium described herein may further include operations, features, means, or instructions for linearizing the digital signal may be based on detecting that a change in temperature exceeds a threshold value.

Some examples of the method, UEs, and non-transitory computer-readable medium described herein may further include operations, features, means, or instructions for linearizing the digital signal may be based on detecting a change in the gain state and the receiving analog front end includes at least the set of multiple amplifiers at the UE.

Some examples of the method, UEs, and non-transitory computer-readable medium described herein may further include operations, features, means, or instructions for linearizing the digital signal may be based on detecting a change in a signal-to-noise ratio associated with the digital signal and the change in the signal-to-noise ratio may be based on a change in the gain state, a change in temperature, or both.

A method for wireless communication at a network entity is described. The method may include receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the receiving analog front end and transmitting a second message indicating a frequency domain allocation for the first transmission based on receiving the first message, where the second message indicates the UE to linearize the digital signal.

A network entity for wireless communication is described. The network entity may include one or more memories and one or more processors coupled with the one or more memories. The one or more processors may be individually or collectively configured to receive a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the receiving analog front end and transmit a second message indicating a frequency domain allocation for the first transmission based on receiving the first message, where the second message indicates the UE to linearize the digital signal.

Another network entity for wireless communication is described. The network entity may include means for receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the receiving analog front end and means for transmitting a second message indicating a frequency domain allocation for the first transmission based on receiving the first message, where the second message indicates the UE to linearize the digital signal.

A non-transitory computer-readable medium storing code is described. The code may include instructions executable by a processor to receive a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the receiving analog front end and transmit a second message indicating a frequency domain allocation for the first transmission based on receiving the first message, where the second message indicates the UE to linearize the digital signal.

Some examples of the method, network entities, and non-transitory computer-readable medium described herein may further include operations, features, means, or instructions for receiving a third message indicating a capability to mitigate a blocking frequency band based on linearizing the digital signal.

In some examples of the method, network entities, and non-transitory computer-readable medium described herein, the frequency domain allocation indicates at least one frequency band adjacent to the blocking frequency band based on receiving the third message.

Some examples of the method, network entities, and non-transitory computer-readable medium described herein may further include operations, features, means, or instructions for receiving a request message to transmit a training signal with a transmit power that may be below a threshold transmit power, the training signal associated with estimating one or more parameters for linearizing a digital signal outputted by the receiving analog front end of the UE and transmitting, in response to the request message, a message indicating that the UE may be allowed to transmit the training signal with the transmit power for one or more symbols.

In some examples of the method, network entities, and non-transitory computer-readable medium described herein, the one or more parameters include an amplitude modulation (AM) to AM distortion, an AM to phase modulation (PM) distortion, a target gain value associated with an analog-to-digital converter of the UE, or any combination thereof.

In some examples of the method, network entities, and non-transitory computer-readable medium described herein, the second message indicates the UE to linearize the digital signal may be based on detecting that a change in temperature at the UE exceeds a threshold value.

In some examples of the method, network entities, and non-transitory computer-readable medium described herein, the second message indicates the UE to linearize the digital signal may be based on detecting a change in a gain state of the receiving analog front end, the gain state including a set of configurations associated with a set of multiple amplifiers at the UE and the receiving analog front end includes the set of multiple amplifiers.

In some examples of the method, network entities, and non-transitory computer-readable medium described herein, the second message indicates the UE to linearize the digital signal may be based on detecting a change in a signal-to-noise ratio associated with the digital signal and the change in the signal-to-noise ratio may be based on a change in a gain state, a change in temperature, or both.

A method for wireless communications at a UE is described. The method may include transmitting a request message to transmit a training signal with a transmit power that is below a threshold transmit power, the training signal associated with estimating one or more parameters for linearizing a digital signal outputted by a receiving analog front end of the UE, transmitting the training signal with the transmit power based on transmitting the request message, and measuring the training signal to estimate the one or more parameters.

A UE for wireless communications is described. The UE may include one or more memories and one or more processors coupled with the one or more memories. The one or more processors may be individually or collectively configured to transmit a request message to transmit a training signal with a transmit power that is below a threshold transmit power, the training signal associated with estimating one or more parameters for linearizing a digital signal outputted by a receiving analog front end of the UE, transmit the training signal with the transmit power based on transmitting the request message, and measure the training signal to estimate the one or more parameters.

Another UE for wireless communications is described. The UE may include means for transmitting a request message to transmit a training signal with a transmit power that is below a threshold transmit power, the training signal associated with estimating one or more parameters for linearizing a digital signal outputted by a receiving analog front end of the UE, means for transmitting the training signal with the transmit power based on transmitting the request message, and means for measuring the training signal to estimate the one or more parameters.

A non-transitory computer-readable medium storing code is described. The code may include instructions executable by a processor to transmit a request message to transmit a training signal with a transmit power that is below a threshold transmit power, the training signal associated with estimating one or more parameters for linearizing a digital signal outputted by a receiving analog front end of the UE, transmit the training signal with the transmit power based on transmitting the request message, and measure the training signal to estimate the one or more parameters.

Some examples of the method, UEs, and non-transitory computer-readable medium described herein may further include operations, features, means, or instructions for receiving, in response to the request message, a message indicating that the UE may be allowed to transmit the training signal with the transmit power for one or more symbols, where the training signal may be transmitted during the one or more symbols.

In some examples of the method, UEs, and non-transitory computer-readable medium described herein, estimating the one or more parameters may include operations, features, means, or instructions for generating a set of lookup tables, each lookup table of the set of lookup tables corresponding to a gain state and including a set of multiple output voltage values corresponding to a set of multiple input voltage values associated with the receiving analog front end.

Some examples of the method, UEs, and non-transitory computer-readable medium described herein may further include operations, features, means, or instructions for receiving a first transmission, the first transmission being associated with a first gain state including a set of configurations associated with a set of multiple amplifiers at the UE and linearizing the digital signal associated with the first transmission based on the first gain state and a first lookup table corresponding to the first gain state, where linearizing the digital signal includes obtaining an output voltage value from the first lookup table corresponding to an input voltage value associated with the receiving analog front end.

Some examples of the method, UEs, and non-transitory computer-readable medium described herein may further include operations, features, means, or instructions for estimating an amplitude modulation (AM) to AM distortion, an AM to phase modulation (PM) distortion, or both and estimating a target gain value based on the AM to AM distortion, the AM to PM distortion, or both, where generating the set of lookup tables may be based on estimating the target gain value.

In some examples of the method, UEs, and non-transitory computer-readable medium described herein, the training signal may be linear based on transmitting the training signal with the transmit power.

DETAILED DESCRIPTION

Figure 1:
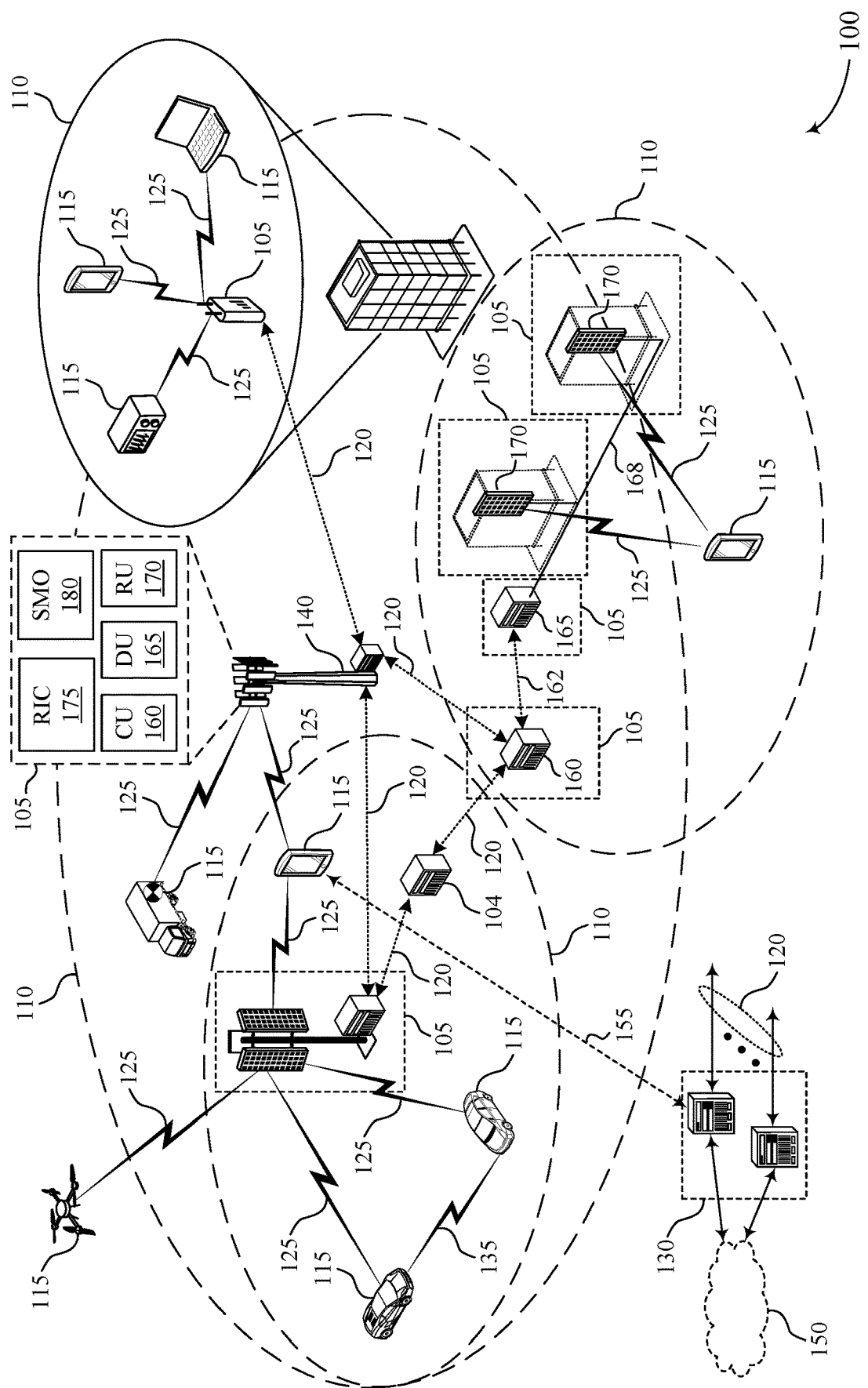
FIG. 1 shows an example of a wireless communications system that supports analog front end linearization in accordance with one or more aspects of the present disclosure.

In some examples, a UE receiving a transmission may experience noise and non-linearity originating from one or more components of the UE, which may negatively impact a signal-to-noise ratio (SNR) of a received signal. In some cases, components of an analog front end of the UE, which may include components associated with processing of an analog signal associated with an upcoming transmission, such as a plurality of amplifiers, phase shifters, combiners, mixers, and other components, may be sources of non-linearity. This may result in a decreased SNR of a signal as the UE processes the signal in a digital domain following the analog front end, which may result in decreased reception quality and may increase the risk of retransmissions. As such, to improve reception and an SNR associated with received signals, techniques for reducing the non-linearity impact of the analog front end may be desired.

In accordance with examples as described herein, a UE may implement a linearizer for linearizing a digital signal outputted by an analog front end of the UE. The linearizer may be or include a set of LUTs, such as memory-less LUTs, and the UE may obtain (e.g., read, lookup) an output voltage value (e.g., for a next component in a digital front end) based on an input voltage value associated with the digital signal. In some examples, each LUT of the set of LUTs may correspond to a gain state associated with the digital signal, and the gain state may be one gain state of a set of gain states (e.g., 16 gain states) configured to the UE 115-a, each gain state corresponding to a set of configurations associated with a plurality of amplifiers (e.g., within the analog front end) of the UE 115-a. To linearize the digital signal, the UE may select a LUT based on the current gain state for the plurality of amplifiers. In some cases, each LUT may have different output voltage values corresponding to different SNR values. Accordingly, the UE may linearize a digital signal at the output of the analog front end, thereby reducing non-linearity caused by components of the analog front end and increasing the SNR associated with the received transmission.

In some examples, the UE may transmit a message indicating a capability to perform the linearization to a network entity. Further, the UE may indicate its capability to mitigate a blocking frequency based on performing the linearization. As such, the network entity may perform frequency allocation accordingly, and the network entity may allocate a frequency adjacent to the blocking frequency if the UE indicated a capability to mitigate the blocking frequency. In some examples, the UE may perform training for the linearizer, which may involve transmitting a training signal and measuring the training signal to determine one or more parameters and generate the set of LUTs. In some cases, to ensure the training signal is linear (e.g., does not suffer from non-linearity), the UE may transmit a request message to the network entity to transmit the training signal with a transmit power that is lower than a threshold transmit power (e.g., a minimum transmit power that the UE may be subject to). The network entity may transmit a message allowing the UE to transmit the training signal with the transmit power for one or more symbols, and the UE may transmit the training signal during the one or more symbols. As such, the UE may perform training procedures for the linearizer and may generate the set of LUTs.

Aspects of the disclosure are initially described in the context of wireless communications systems. Aspects of the disclosure are additionally described in the context of receiving circuitry, diagrams, and process flows relating to analog front end linearization. Aspects of the disclosure are further illustrated by and described with reference to apparatus diagrams, system diagrams, and flowcharts that relate to analog front end linearization.

FIG. 1 shows an example of a wireless communications system 100 that supports analog front end linearization in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support analog front end linearization as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR, or otherwise acceptable signal quality based on listening according to multiple beam directions).

In some examples, a UE 115 receiving a transmission may experience noise and non-linearity originating from one or more components of the UE, which may negatively impact an SNR of a received signal. In some cases, components of an analog front end of the UE, which may include components associated with processing of an analog signal associated with an upcoming transmission, such as a plurality of amplifiers, phase shifters, combiners, mixers, and other components, may be sources of non-linearity. This may result in a decreased SNR of a signal as the UE 115 processes the signal in a digital domain following the analog front end, which may result in decreased reception quality and may increase the risk of retransmissions. As such, to improve reception and an SNR associated with received signals, techniques for reducing the non-linearity impact of the analog front end may be desired.

In accordance with examples as described herein, a UE 115 may implement a linearizer for linearizing a digital signal outputted by an analog front end of the UE. The linearizer may be or include a set of LUTs, such as memory-less LUTs, and the UE 115 may obtain (e.g., read, lookup) an output voltage value (e.g., outputted to a next component in a digital front end) based on an input voltage value associated with the digital signal obtained from the analog front end. In some examples, each LUT of the set of LUTs may correspond to a gain state associated with the digital signal, and the gain state may correspond to a set of configurations associated with a plurality of amplifiers of the UE 115 (e.g., within the analog front end). To linearize the digital signal, the UE 115 may select a LUT based on the current gain state for the plurality of amplifiers. In some cases, each LUT may have different output voltage values corresponding to different SNR values. Accordingly, the UE 115 may linearize a digital signal at the output of the analog front end, thereby reducing non-linearity caused by components of the analog front end and increasing the SNR associated with the received transmission.

In some examples, the UE 115 may transmit a message indicating a capability to perform the linearization to a network entity 105. Further, the UE 115 may indicate its capability to mitigate a blocking frequency based on performing the linearization. As such, the network entity 105 may perform frequency allocation accordingly, and the network entity 105 may allocate a frequency adjacent to the blocking frequency if the UE 115 indicated a capability to mitigate the blocking frequency. In some examples, the UE 115 may perform training for the linearizer, which may involve transmitting a training signal and measuring the training signal to determine one or more parameters and generate the set of LUTs. In some cases, to ensure the training signal is linear (e.g., does not suffer from non-linearity), the UE 115 may transmit a request message to the network entity 105 to transmit the training signal with a transmit power that is lower than a threshold transmit power (e.g., a minimum transmit power that the UE 115 may be subject to). The network entity 105 may transmit a message allowing the UE 115 to transmit the training signal with the transmit power for one or more symbols, and the UE 115 may transmit the training signal during the one or more symbols. As such, the UE 115 may perform training procedures for the linearizer and may generate the set of LUTs.

Figure 2:
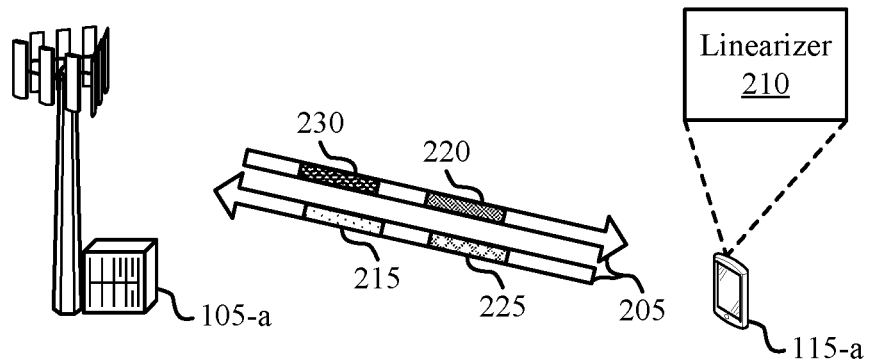
FIG. 2 shows an example of a wireless communications system that supports analog front end linearization in accordance with one or more aspects of the present disclosure.
Figure 2:
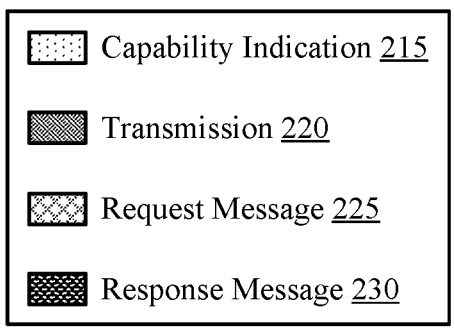

FIG. 2 shows an example of a wireless communications system 200 that supports analog front end linearization in accordance with one or more aspects of the present disclosure. The wireless communications system 200 may include a UE 115-a and a network entity 105-a, which may be examples of corresponding components as described herein, with reference to FIG. 1. The network entity 105-a and the UE 115-a may communicate via communication links 205, which may be examples of the communication links 125 as described with reference to FIG. 1.

A UE 115-a may include a plurality of components to process a received signal (e.g., as part of an Rx chain). In some examples, the plurality of components may be part of an analog front end (e.g., a receiving or Rx analog front end), which may be involved with processing an analog signal received by one or more antennas of the UE 115-a, a digital front end, which may be involved with processing a digital signal outputted by the analog front end, and a mobile data modem, which may be involved in fast Fourier transform (FFT) procedures for the digital signal. The UE 115-a may process the received signal in accordance with a gain state of the analog front end, which may define a set of configurations (e.g., including one or more operational parameters) for a plurality of amplifiers of the UE 115-a (e.g., within the Rx chain or the analog front end), such as low-noise amplifiers, variable gain amplifiers, and other amplifiers. In some examples, the gain state may be selected by an automatic gain controller (AGC) based on reference signal measurements (e.g., synchronization signal block (SSB) or tracking reference signal (TRS) measurements). In some cases, the gain state may affect the impact of different factors (e.g., thermal noise, non-linearity) on an SNR of a received transmission. An example arrangement of these components is illustrated herein, with reference to FIG. 3.

In some examples, an SNR associated with a received signal by a UE 115-a may be limited by various factors at the analog front end of the UE 115-a. These factors may include thermal noise (e.g., evaluated using kTBFG, where k is the Boltzmann constant. T is a temperature in Kelvin, B is a signal channel bandwidth, F is a noise figure, and G is a total gain) of components within the analog front end, non-linearity (e.g., a third-order intermodulation (IM3)) of the components (e.g., which may be large for low-noise amplifiers), factors affecting an analog-to-digital converter (e.g., integral non-linearity, differential non-linearity, quantization, jitter), and other factors. In some cases, such as those not limited by thermal noise, the SNR may be limited in large part by the non-linearity of the analog front end components. This may result in a decreased SNR of a signal as the UE 115-a processes the signal in a digital domain following the analog front end, which may result in decreased reception quality and may increase the risk of retransmissions. As such, to improve reception and an SNR associated with received signals, techniques for reducing the non-linearity impact of the analog front end may be desired.

In accordance with examples as described herein, a UE 115-a may implement a linearizer 210 for linearizing a digital signal outputted by an analog front end of the UE 115-a. The linearizer 210 may include a set of LUTs, such as memory-less LUTs. To linearize the digital signal associated with a transmission 220 by the network entity 105-a, the UE 115-a may obtain (e.g., read, lookup) an output voltage value (e.g., outputted to a next component in a digital front end) based on an input voltage value associated with the digital signal obtained from the analog front end (e.g., from an analog-to-digital converter (ADC) of the analog front end). In some cases, each LUT may have different output voltage values corresponding to different SNR values (e.g., a current SNR value determined by the UE 115-a). Accordingly, the UE 115-a may linearize a digital signal outputted by the analog front end (e.g., at the output of the analog front end or the input of a digital front end), thereby reducing non-linearity caused by components of the analog front end and increasing the SNR associated with the received transmission.

In some examples, each LUT of the set of LUTs of the linearizer 210 may correspond to a gain state of the analog front end of the UE 115-a associated with the digital signal. For example, each LUT may have different values, and the UE 115-a may select an LUT based on the current gain state. The UE 115-a may determine a gain state for the analog front end (e.g., for a plurality of amplifiers of the analog front end) using an AGC based on reference signal measurements (e.g., SSB or TRS), and the UE 115-a may select an LUT of the set of LUTs based on the gain state and use the selected LUT to linearize the digital signal. In some examples, to avoid the SNR from being limited by thermal noise, a gain state may be selected (e.g., by the AGC) to shift the impact of these factors on the SNR of the digital signal. For example, a gain state may be selected such that the impact of non-linearity of the analog front end components on the SNR is increased, but the impact of thermal noise on the SNR is decreased. Thus, as the UE 115-a may decrease the non-linearity of the analog front end components by linearizing the digital signal using the linearizer 210, the SNR associated with the digital signal may overall be increased, even with a same amount of thermal noise. In some examples, each LUT may also have values depending on a temperature of the UE 115-a, a carrier frequency, an instantaneous bandwidth (IBW), or a beam in use by the UE 115-a. Additionally, or alternatively, the UE 115-a may be configured with different LUTs for different temperature values, carrier frequencies, IBWs, and beams.

In some examples, the UE 115-a may load (e.g., update) values associated with a LUT for linearizing a digital signal based on a trigger. For example, the UE 115-a may select a LUT (e.g., a new LUT) and load values associated with the LUT based on detecting a change in temperature (e.g., that a change in temperature exceeds a threshold value, based on a change in the gain state for the analog front end, or both.

Additionally, or alternatively, the UE 115-*a* may select a LUT and load values associated with the LUT based on detecting a change in an SNR (e.g., that a change in SNR exceeds a threshold value), and the change in the SNR may be based on a change in the gain state, a change in temperature, or both.

In some cases, the UE 115-*a* may experience interference from blocking frequencies adjacent to a frequency in which the transmission 220 is being transmitted. For instance, the UE 115-*a* may experience interference from an external signal transmitted to or from another UE 115-*a*, interference from a frequency jammer, or self-interference (e.g., when performing full-duplex procedures). By implementing the linearizer 210, the UE 115-*a* may mitigate the interference from blocking frequencies by increasing the SNR of a received signal. For example, the analog front end components may mitigate blocking frequencies (e.g., from self-interference, adjacent blockers, or jammers) by using non-linear interference cancelation (NLIC) or linear interference cancelation (LIC), which may introduce interference (e.g., in the form of inter-modes). The linearizer 210 may mitigate the introduced interference by reducing the non-linearity of the analog front end components. The linearizer 210 may also improve power savings at the UE 115-*a*, as the use of the linearizer 210 may allow for the UE 115-*b* to reduce a third-order output intercept point (OIP3) while maintaining a same SNR, which may decrease power consumption. In some cases, the linearizer 210 may allow for a relaxation of receiving AGC requirements in sidelink scenarios due to increased SNR in sidelink transmissions.

In some examples, the UE 115-*a* may transmit a message containing a capability indication 215 to the network entity 105-*a*, which may indicate the network entity 105-*a* of a capability of the UE 115-*a* to linearize a digital signal outputted by the analog front end of the UE 115-*a*. As such, the network entity 105-*a* may perform scheduling for the UE 115-*a* based on the capability. For example, the UE 115-*a* may indicate, in the capability indication 215, a capability to mitigate an adjacent blocking frequency based on the use of the linearizer 210. The network entity 105-*a* may transmit a message indicating a frequency domain allocation for a transmission 220 that is adjacent to the blocking frequency based on the capability indication 215. For example, if the UE 115-*a* is operating near a second UE 115 that is receiving or transmitting on a first frequency band, the network entity 105-*a* may allocate a frequency band adjacent to the first frequency band for the transmission 220 to the UE 115-*a*. Accordingly, the use of the linearizer 210 may improve scheduling by the network entity 105-*a* by increasing a potential utilization of the overall frequency bandwidth.

The UE 115-*a* may perform training procedures for the linearizer 210. In some examples, the training procedures may involve the UE 115-*a* measuring one or more training signals, which may be known to the UE 115-*a* (e.g., the training signals may be configured or indicated to the UE 115-*a* or transmitted by the UE 115-*a*). This may allow the UE 115-*a* to determine non-linear characteristics of analog front end components. For instance, the UE 115-*a* may measure the training signals and compare expected values (e.g., expected power values) for the training signals with measured values, which may allow the UE 115-*a* to determine an amount of non-linearity introduced by the analog front end components. In some cases, the one or more training signals may vary in power, such that the UE 115-*a* may determine non-linearity values for the analog front end components while operating at different receive power values. Additionally, or alternatively, the UE 115-*a* may perform measurements while operating with different gain states (e.g., based on the power of the training signals). Thus, the UE 115-*a* may generate a set of LUTs to correct for the non-linearity based on measuring the training signals. For example, the UE 115-*a* may determine values for each LUT, such as output power values that correspond to input power values of a digital signal, and the UE 115-*a* may determine a different LUT for each gain state.

The one or more training signals may be transmitted by another device (e.g., a network entity 105), or the training signals may be transmitted by the UE 115-*a*. In some cases, if the one or more training signals are transmitted with non-linearity introduced by components of a transmitting device, the accuracy of the training procedures at the UE 115-*a* may be compromised. For example, the UE 115-*a* may interpret non-linearity introduced by components of the transmitting device as originating from components of the analog front end of the UE 115-*a*, which may result in less accurate linearization by the linearizer 210. Thus, to improve accuracy during training of the linearizer 210, the one or more training signals may be transmitted linearly (e.g., with minimal non-linearity). In some examples, the training procedures may be performed in a factory setting (e.g., during manufacturing of the UE 115-*a*), which may allow for a linear transmission of the one or more training signals. Additionally, or alternatively, the UE 115-*a* may perform the training procedures in a pilot mode, where the UE 115-*a* may transmit the one or more training signals using transmitting components of the UE 115-*a* and receive the one or more training signals using receiving components of the analog front end.

To perform a linear transmission (e.g., with low or no levels of non-linearity) of the one or more training signals, the UE 115-*a* may transmit the one or more training signals with a relatively low transmit power. In some cases, the UE 115-*a* may be subject to (e.g., configured with) transmit power requirements (e.g., by the network entity 105-*a*, by a standard), such as a minimum transmit power. However, transmitting the one or more training signals with the minimum transmit power may be too large, and may still cause non-linearity to be introduced due to the transmitting components of the UE 115-*a*. As such, the UE 115-*a* may transmit a request message 225 to the network entity 105-*a* that requests for the UE 115-*a* to transmit the one or more training signals with a transmit power that is below the minimum transmit power. The UE 115-*a* may receive a response message 230 that allows or indicates the UE 115-*a* to perform the training signal transmission. In some examples, the response message 230 may allocate one or more symbols during which the UE 115-*a* may transmit with a transmit power below the minimum transmit power. In some cases, the one or more symbols may be allocated periodically (e.g., such that the one or more symbols repeat) to allow the UE 115-*a* to perform the training procedures, and the one or more symbols may repeat sparsely (e.g., with a relatively low frequency) such that the UE 115-*a* does not violate the minimum transmit power for other transmissions. Accordingly, the UE 115-*a* may perform the training signal transmission with a lower transmit power, which may allow for the one or more training signals to be linear, thereby improving the accuracy of the training procedures.

Figure 3:
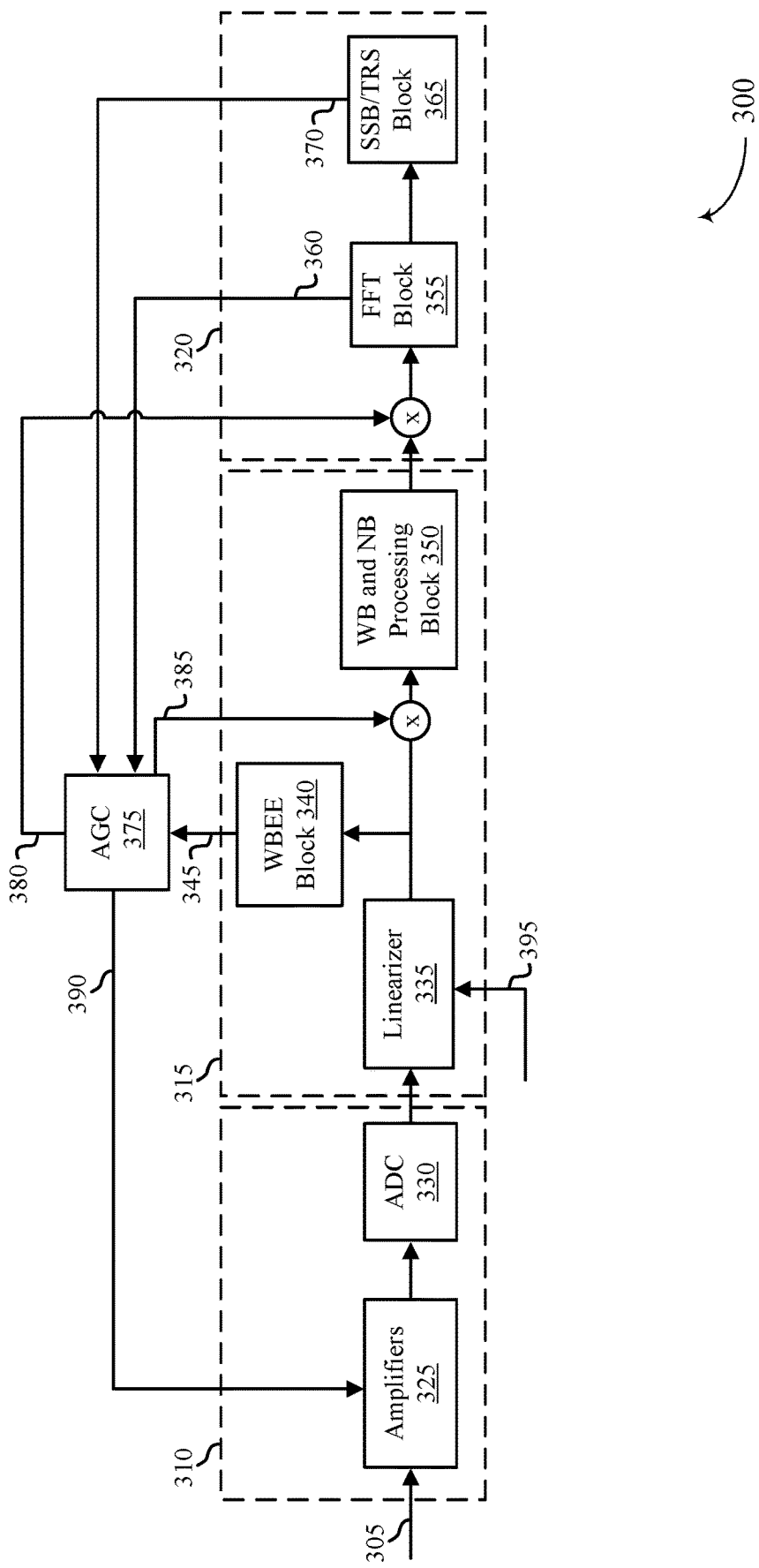
FIG. 3 shows an example of functional blocks of a receiving circuitry that supports analog front end linearization in accordance with one or more aspects of the present disclosure.

FIG. 3 shows an example of functional blocks of a receiving circuitry 300 that supports analog front end linearization in accordance with one or more aspects of the present disclosure. The receiving circuitry 300 may be included within a UE 115 and may include a linearizer 335, which may be an example of the linearizer 210 as described herein, with reference to FIG. 2. In some cases, the UE 115 may include multiple receiving chains (e.g., associated with multiple antennas), and each receiving chain may be associated with receiving circuitry 300. In some examples, some components may be added to the receiving circuitry 300, and some components may be omitted from the receiving circuitry 300. In some examples, some components may be differently arranged than as illustrated, and described with respect to, FIG. 3.

The receiving circuitry 300 may include an analog front end 310 (e.g., a receiving analog front end or an Rx analog front end), which may be involved with processing an analog signal 305 obtained by receiving a transmission (e.g., via one or more antennas (not shown in FIG. 3)). The analog front end 310 may include amplifiers 325, which may process the analog signal 305. The amplifiers 325 may include a low noise amplifier and one or more variable gain amplifiers. In some examples, the amplifiers 325 may also include other components, such as phase shifters, combiners, mixers, or other components. The amplifiers 325 may output a processed analog signal to an ADC 330, which may convert the analog signal to a digital signal.

The receiving circuitry 300 may include a digital front end 315, which may be involved with processing a digital signal outputted by the ADC 330 of the analog front end 310. For example, the linearizer 335 may receive the digital signal outputted by the ADC 330, and may linearize the digital signal as described herein, with reference to FIG. 2. The linearizer 335 may include a set of LUTs, such as memory-less LUTs. To linearize the digital signal, the linearizer 335 may output a voltage value (e.g., an output voltage value) based on a voltage value (e.g., an input voltage value) obtained from the ADC 330 in accordance with an LUT of the set of LUTs. In some cases, each LUT may have different output voltage values corresponding to different SNR values (e.g., a current SNR value determined by or indicated to the linearizer 335 via a signal 395).

In some examples, each LUT of the set of LUTs of the linearizer 335 may correspond to a gain state of the analog front end 310. For example, each LUT may have different values, and the linearizer 335 may select an LUT based on a current gain state. In some cases, the linearizer 335 may receive an indication of the current gain state via a signal 395, which may be outputted by an AGC 475. In some examples, the linearizer 335 may also select an LUT from the set of LUTs based on a current beam used for reception of a transmission. The linearizer 335 may obtain an indication of the current beam via the signal 395 (e.g., or a different signal).

The digital front end may include a wideband energy estimation (WBEE) block 340. The WBEE block 340 may obtain the digital signal linearized by the linearizer 335 and calculate a WBEE associated with the digital signal. The WBEE block 340 may output a signal 345 that may indicate the calculated WBEE to the AGC 475. The digital front end may also include a wideband (WB) and narrowband (NB) processing block 350. The WB and NB processing block 350 may receive the digital signal outputted by the linearizer 335 and perform processing operations. The processing operations may be based on whether the digital signal corresponds to a WB transmission or a NB transmission.

The receiving circuitry 300 may include a mobile data modem 320, which may be involved in FFT procedures for the digital signal. For example, the mobile data modem 320 may include an FTT block 355, which may perform FFT procedures on the digital signal outputted by the WB and NB processing block 350. In some examples, the FTT block 355 may output a signal 360 that may indicate a FFT energy estimation to the AGC 375. The mobile data modem 320 may also include an SSB/TRS block 365. The SSB/TRS block 365 may process reference signal measurements, such as SSB measurements or TRS measurements, associated with the digital signal. In some examples, the SSB/TRS block 365 may output a signal 370 that indicates the reference signal measurements to the AGC 375.

The receiving circuitry 300 may include the AGC 375. The AGC 375 may provide feedback (e.g., closed-loop feedback) to components of the receiving circuitry 300. For example, the AGC 375 may process the signal 345, the signal 360, and the signal 370 outputted by components of the receiving circuitry 300. The AGC 375 may output a signal 380 (e.g., as part of a first inner loop) which may alter a gain (e.g., a voltage value) associated with the digital signal outputted by the WB and NB processing block 350 and prior to being received by the SSB/TRS block 365. Similarly, the AGC 375 may output a signal 385 (e.g., as part of a second inner loop) which may alter a gain associated with the digital signal outputted by the linearizer 335 and prior to being received by the WB and NB processing block 350.

The AGC 375 may also determine a gain state based on the signal 345, the signal 360, the signal 370, or any combination thereof, as described herein. For example, the AGC 375 may select a gain state based on SSB measurements or TRS measurements indicated in the signal 370, and the gain state may indicate one or more operation parameters for components of the analog front end 310. In some examples, the AGC 375 may indicate the gain state to the amplifiers 325 via a signal 390. Additionally, or alternatively, the AGC 375 may indicate the gain state to the linearizer 335 via the signal 395. As such, the linearizer 335 may select an LUT of the set of LUTs based on the gain state and use the selected LUT to linearize the digital signal.

In some examples, the AGC 375 may select a gain state to adjust a tradeoff in the effects of thermal noise (e.g., evaluated using kTBFG) and non-linearity of analog front end 310 components (e.g., IM3) on an SNR associated with a signal. For example, the AGC 375 may select a gain state such that the impact of non-linearity of the analog front end components on the SNR is increased, but the impact of thermal noise on the SNR is decreased. Thus, as the linearizer 335 may then decrease the non-linearity of the digital signal by linearizing the digital signal, the SNR associated with the digital signal may overall be increased and a noise figure (NF) may be decreased, even with a same amount of thermal noise present at the receiving circuitry 300.

Figure 4:
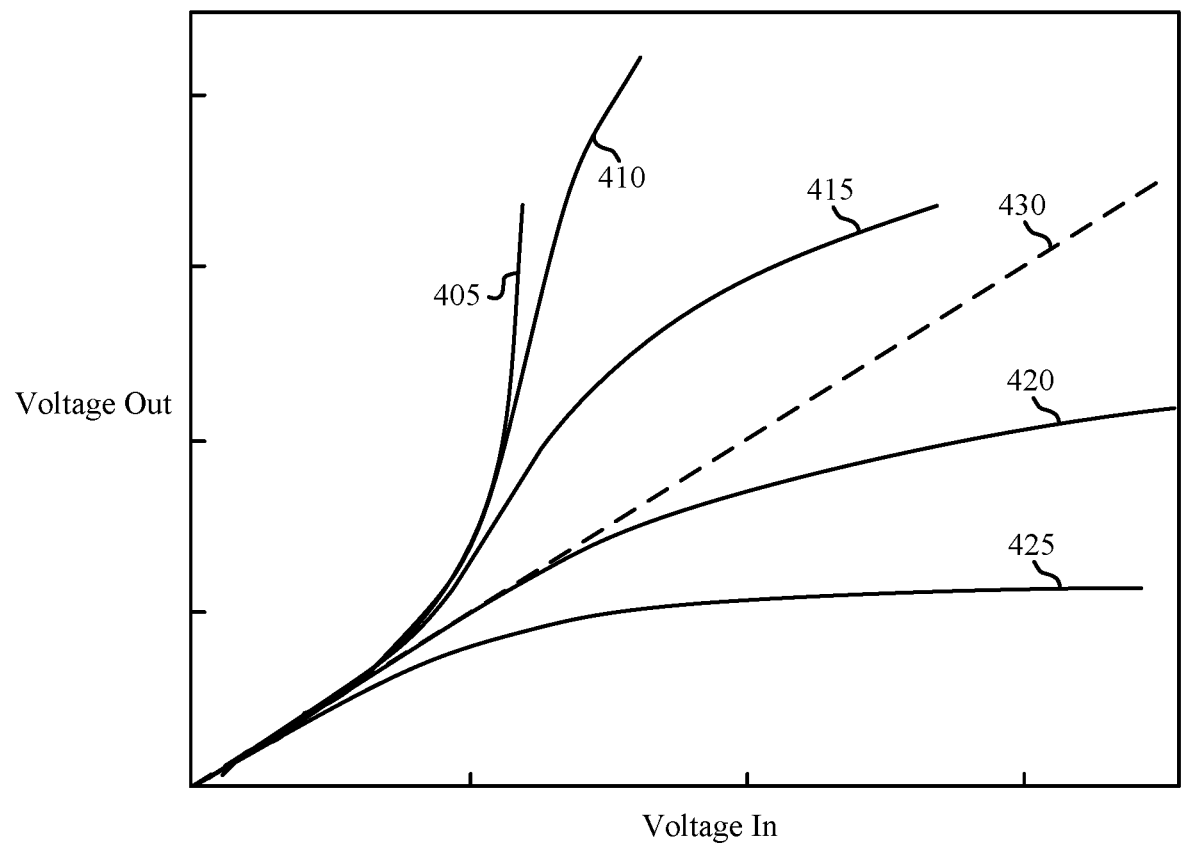
FIG. 4 shows an example of a diagram that supports analog front end linearization in accordance with one or more aspects of the present disclosure.

FIG. 4 shows an example of a diagram 400 that supports analog front end linearization in accordance with one or more aspects of the present disclosure. The diagram 400 may illustrate output voltage values (e.g., voltage out) corresponding to input voltage values (e.g., voltage in) of a digital signal (e.g., output by an analog front end or an ADC). The diagram 400 may be implemented in a linearizer (e.g., a linearizer 210, a linearizer 335) as described herein, and may represent values associated with an LUT (e.g., a single LUT of a set of LUTs).

The diagram 400 may illustrate one or more curves that may illustrate a relationship between the input voltage values and the output voltage values. For example, the diagram 400 may include a curve 405, a curve 410, a curve 415, a curve 420, and a curve 425. The line 430 is a reference line showing where input voltage values equal output voltage values and may represent values if a linearizer was not used or disabled.

In some examples, each curve of an LUT may be associated with different SNR values. For example, during a training procedure, a UE 115 may determine that the amount of non-linearity at a voltage input value may vary depending on a current SNR value, and the UE 115 may generate the curve 420 (e.g., corresponding to an SNR value of 10 decibels (dB)), the curve 415 (e.g., corresponding to an SNR value of 20 dB), and the curve 410 (e.g., corresponding to an SNR value of 30 dB). The UE 115 may also generate curves based on other factors, such as temperature values, carrier frequencies, IBWs, and which beam is in use. As such, output voltage values obtained from a LUT may be dependent on SNR, temperature values, carrier frequencies, IBWs, and which beam is in use, or any combination thereof, as well as a current gain state, as described herein with reference to FIGS. 3 and 4.

Figure 5:
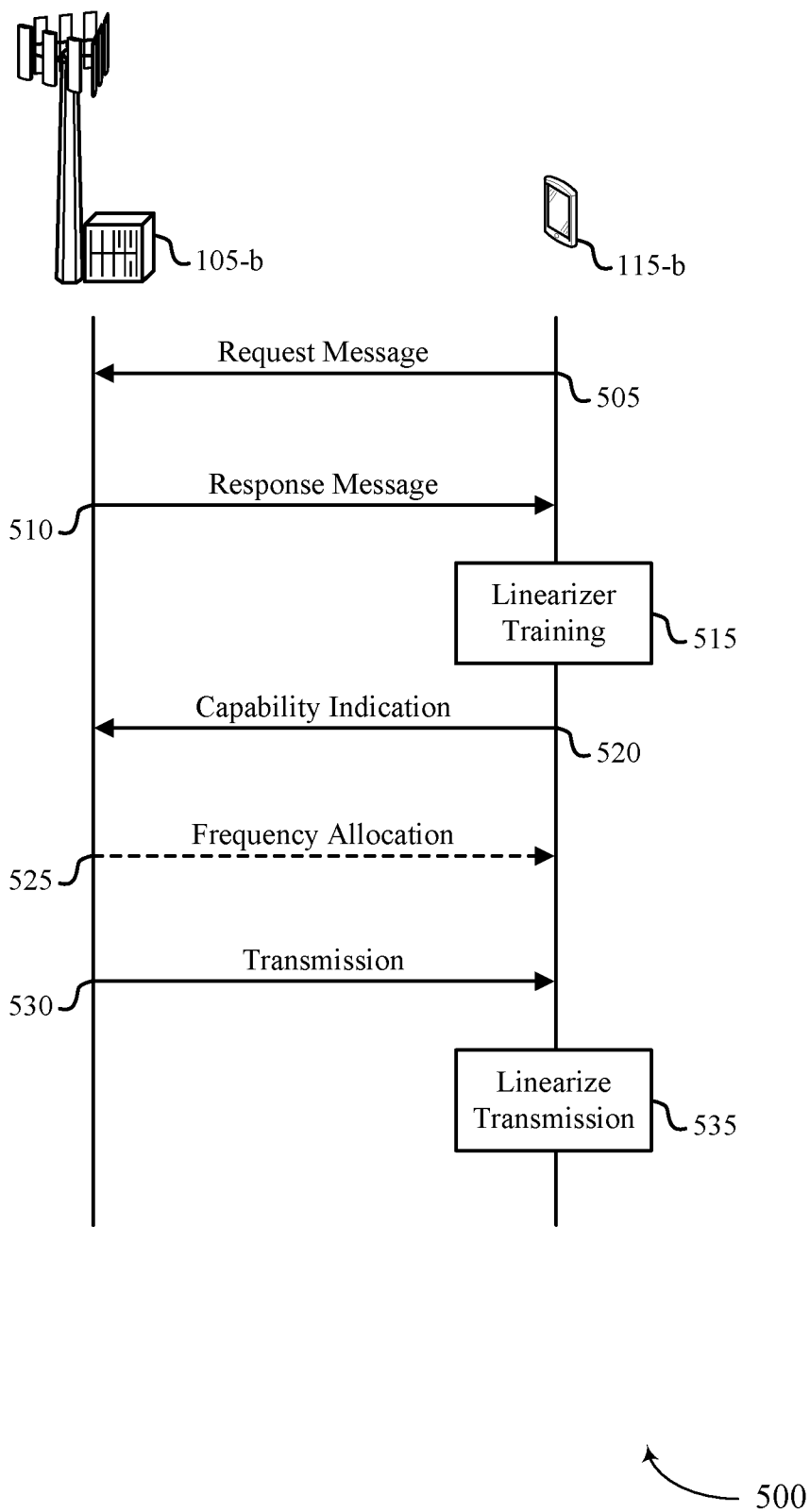
FIG. 5 shows an example of a process flow that supports analog front end linearization in accordance with one or more aspects of the present disclosure.

FIG. 5 shows an example of a process flow 500 that supports analog front end linearization in accordance with one or more aspects of the present disclosure. The process flow 500 illustrates communications between a network entity 105-b and a UE 115-b, which may be examples of corresponding components as described herein. The process flow 500 may illustrate training procedures for a linearizer (e.g., a linearizer 210, a linearizer 335) as described herein, and using the linearizer to linearize a signal associated with a transmission from the network entity 105-b to the UE 115-b. In some cases, steps shown in the process flow 500 may be performed in different orders. Additionally, some steps may be added to the process flow 500 and some steps may be omitted from the process flow 500.

At 505, the UE 115-b may transmit a request message to the network entity 105-b. The request message may request the network entity 105-b for the UE 115-b to transmit one or more training signals with a transmit power that is below a threshold transmit power (e.g., configured to the UE 115-b).

At 510, the network entity 105-a may transmit a response message that allows or indicates the UE 115-b to transmit the one or more training signals with the transmit power. In some examples, the response message may allocate one or more symbols during which the UE 115-b may transmit with a transmit power below the minimum transmit power. In some cases, the one or more symbols may be allocated periodically (e.g., such that the one or more symbols repeat) to allow the UE 115-a to perform periodic training signal transmissions, and the one or more symbols may repeat sparsely (e.g., with a relatively low frequency) such that the UE 115-b does not violate the threshold transmit power (e.g., minimum transmit power) for other transmissions.

At 515, the UE 115-b may perform linearizing training, which may involve generating a set of LUTs. Each LUT may map input voltage values associated with a digital signal output by an analog front end of the UE 115-b to output voltage values (e.g., output by the linearizer for a next component in a digital front end of the UE 115-b). In some examples, each LUT may correspond to a gain state, where a gain state is associated with one or more configurations for a plurality of amplifiers of the UE 115-b.

At 520, the UE 115-b may transmit a message containing a capability indication to the network entity 105-b, which may indicate the network entity 105-b of a capability of the UE 115-b to linearize a digital signal outputted by the analog front end of the UE 115-b. In some examples, the capability indication may indicate a capability of the UE 115-b to mitigate an adjacent blocking frequency based on the use of the linearizer.

At 525, the network entity 105-b may transmit a message indicating a frequency allocation for the UE 115-a based on the capability indication. For example, the network entity 105-b may transmit a message indicating a frequency domain allocation for a transmission that is adjacent to the blocking frequency indicated in the capability indication.

At 530, the network entity 105-b may perform the transmission. The UE 115-b may receive the transmission and process an analog signal associated with the transmission using the analog front end of the UE 115-b.

At 535, the UE 115-b may linearize a digital signal output by the analog front end of the UE 115-b (e.g., by an ADC). To linearize the digital signal, the UE 115-b may obtain an output voltage value from a LUT that corresponds to an input voltage value associated with the digital signal (e.g., input into the linearizer). In some examples, the UE 115-b may select the LUT from a set of LUTs based on a current gain state in use by the UE 115-b.

Figure 6:
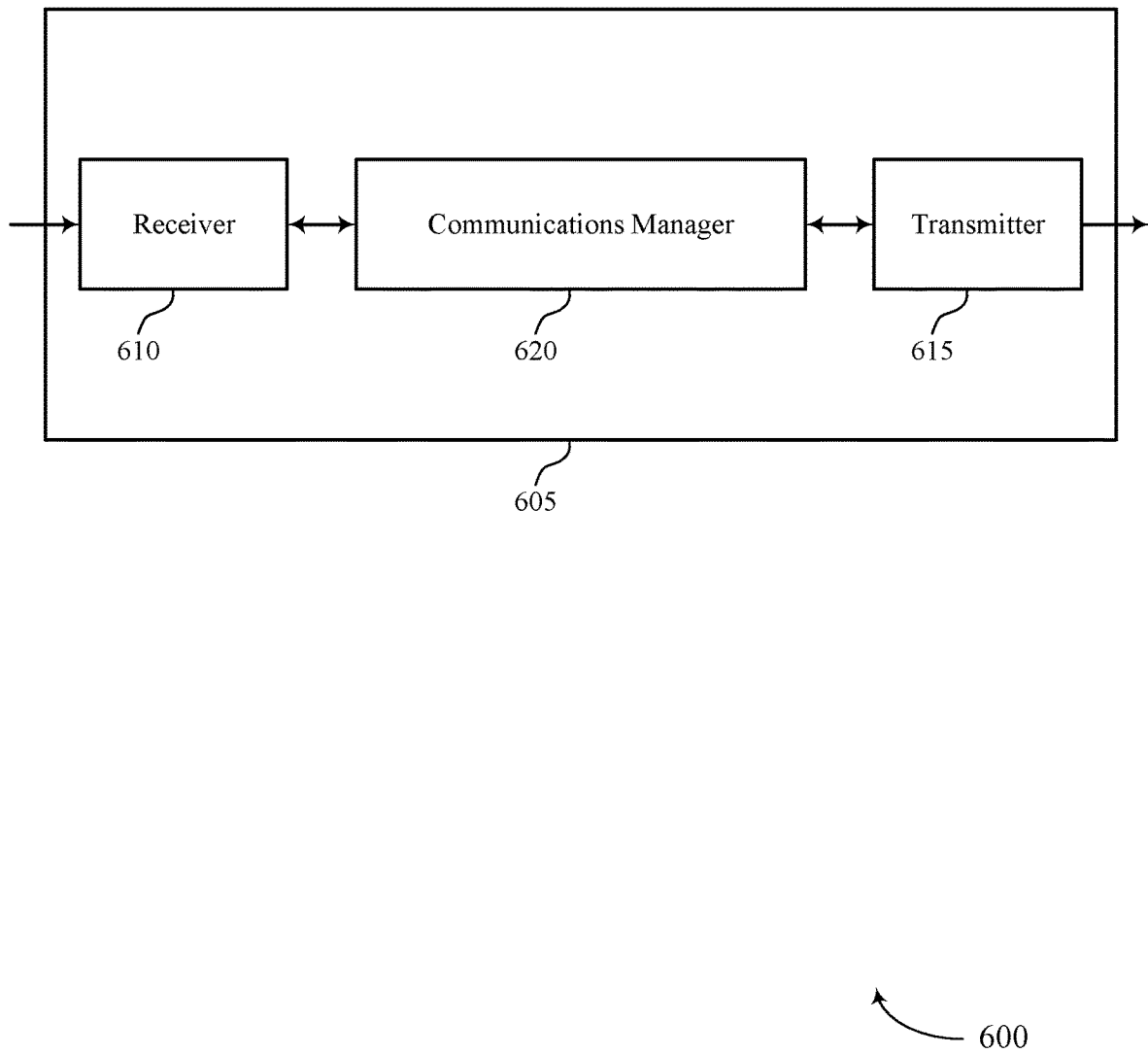
FIGS. 6 and 7 show block diagrams of devices that support analog front end linearization in accordance with one or more aspects of the present disclosure.

FIG. 6 shows a block diagram 600 of a device 605 that supports analog front end linearization in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to analog front end linearization). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to analog front end linearization). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of analog front end linearization as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for transmitting a first message indicating a capability to linearize a digital signal outputted by a receiving analog front end of the UE, the digital signal being associated with a first transmission. The communications manager 620 is capable of, configured to, or operable to support a means for receiving the first transmission, the first transmission being associated with a gain state of the receiving analog front end including a set of configurations associated with a set of multiple amplifiers at the UE. The communications manager 620 is capable of, configured to, or operable to support a means for linearizing the digital signal associated with the first transmission based on the gain state, where linearizing the digital signal includes obtaining an output voltage value corresponding to an input voltage value associated with the analog front end.

Additionally, or alternatively, the communications manager 620 may support wireless communications at a UE in accordance with examples as disclosed herein. For example, the communications manager 620 is capable of, configured to, or operable to support a means for transmitting a request message to transmit a training signal with a transmit power that is below a threshold transmit power, the training signal associated with estimating one or more parameters for linearizing a digital signal outputted by a receiving analog front end of the UE. The communications manager 620 is capable of, configured to, or operable to support a means for transmitting the training signal with the transmit power based on transmitting the request message. The communications manager 620 is capable of, configured to, or operable to support a means for measuring the training signal to estimate the one or more parameters.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for analog front end linearization that may lead to reduced power, higher reception quality, and more efficient scheduling procedures.

Figure 7:
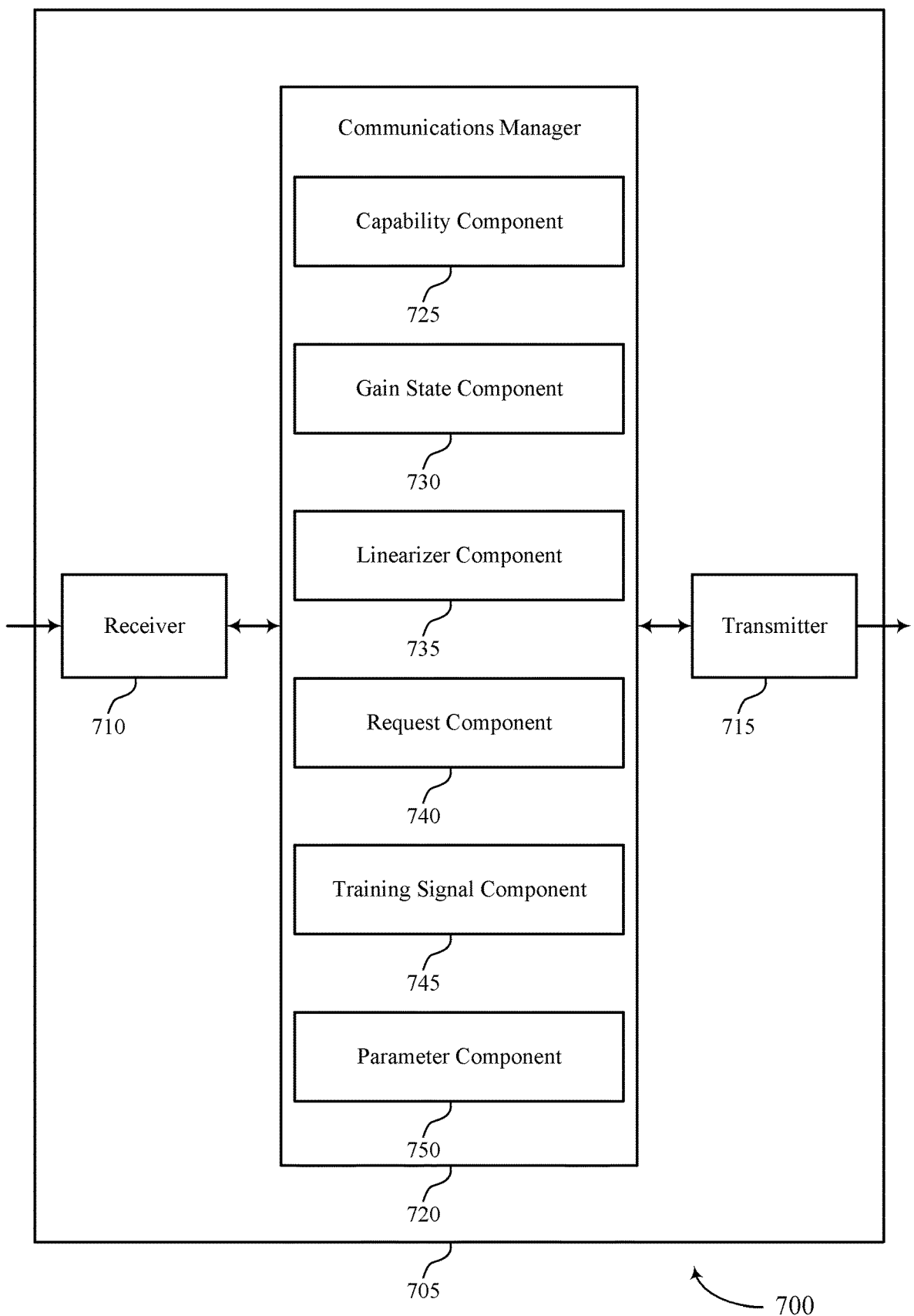

FIG. 7 shows a block diagram 700 of a device 705 that supports analog front end linearization in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to analog front end linearization). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to analog front end linearization). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of analog front end linearization as described herein. For example, the communications manager 720 may include a capability component 725, a gain state component 730, a linearizer component 735, a request component 740, a training signal component 745, a parameter component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The capability component 725 is capable of, configured to, or operable to support a means for transmitting a first message indicating a capability to linearize a digital signal outputted by a receiving analog front end of the UE, the digital signal being associated with a first transmission. The gain state component 730 is capable of, configured to, or operable to support a means for receiving the first transmission, the first transmission being associated with a gain state of the receiving analog front end, the gain state including a set of configurations associated with a set of multiple amplifiers at the UE. The linearizer component 735 is capable of, configured to, or operable to support a means for linearizing the digital signal associated with the first transmission based on the gain state, where linearizing the digital signal includes obtaining an output voltage value corresponding to an input voltage value associated with the analog front end.

Additionally, or alternatively, the communications manager 720 may support wireless communications at a UE in accordance with examples as disclosed herein. The request component 740 is capable of, configured to, or operable to support a means for transmitting a request message to transmit a training signal with a transmit power that is below a threshold transmit power, the training signal associated with estimating one or more parameters for linearizing a digital signal outputted by a receiving analog front end of the UE. The training signal component 745 is capable of, configured to, or operable to support a means for transmitting the training signal with the transmit power based on transmitting the request message. The parameter component 750 is capable of, configured to, or operable to support a means for measuring the training signal to estimate the one or more parameters.

Figure 8:
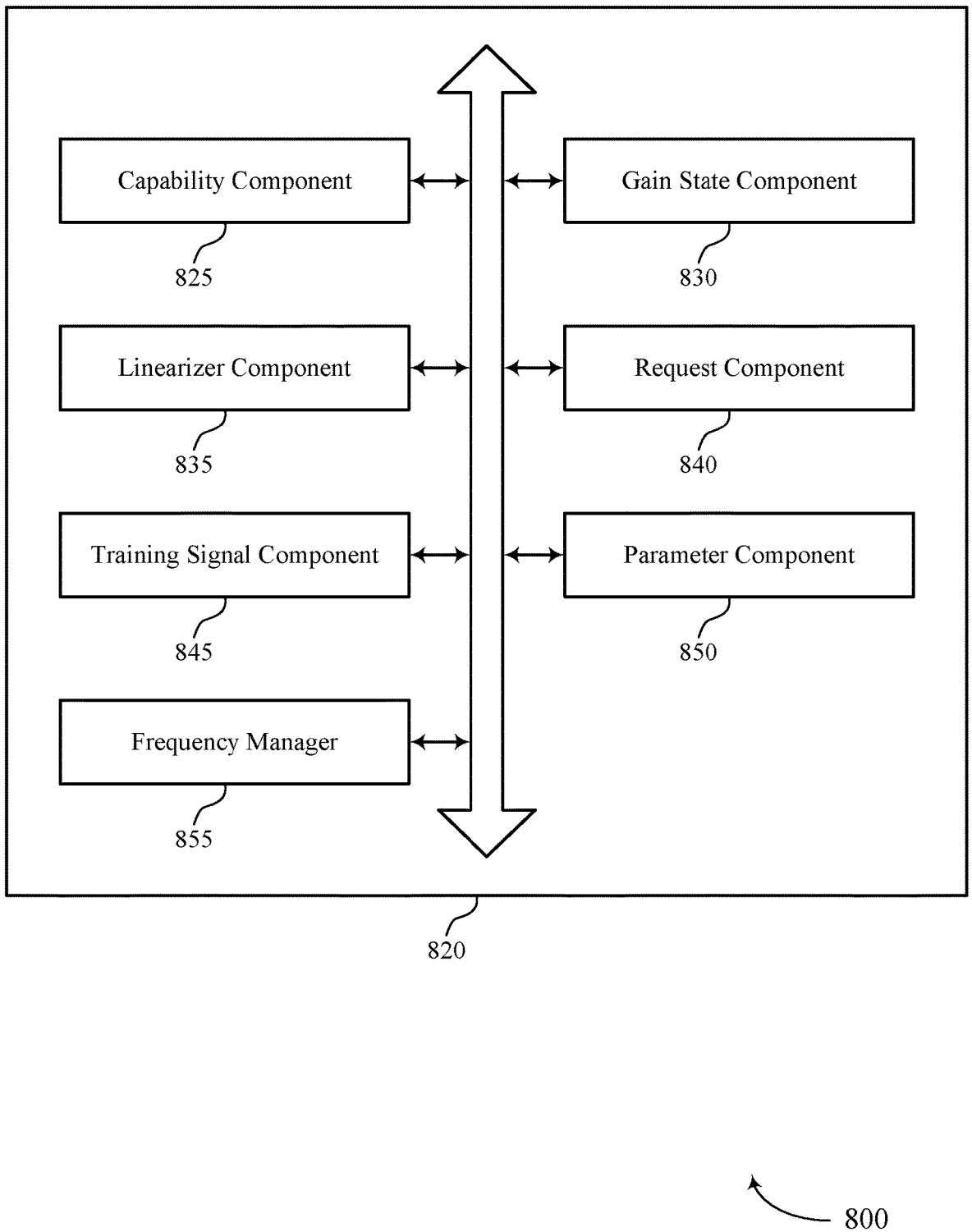
FIG. 8 shows a block diagram of a communications manager that supports analog front end linearization in accordance with one or more aspects of the present disclosure.

FIG. 8 shows a block diagram 800 of a communications manager 820 that supports analog front end linearization in accordance with one or more aspects of the present disclosure. The communications manager 820 may be an example of aspects of a communications manager 620, a communications manager 720, or both, as described herein. The communications manager 820, or various components thereof, may be an example of means for performing various aspects of analog front end linearization as described herein. For example, the communications manager 820 may include a capability component 825, a gain state component 830, a linearizer component 835, a request component 840, a training signal component 845, a parameter component 850, a frequency manager 855, or any combination thereof. Each of these components, or components or subcomponents thereof (e.g., one or more processors, one or more memories), may communicate, directly or indirectly, with one another (e.g., via one or more buses).

The communications manager 820 may support wireless communications at a UE in accordance with examples as disclosed herein. The capability component 825 is capable of, configured to, or operable to support a means for transmitting a first message indicating a capability to linearize a digital signal outputted by a receiving analog front end of the UE, the digital signal being associated with a first transmission. The gain state component 830 is capable of, configured to, or operable to support a means for receiving the first transmission, the first transmission being associated with a gain state of the receiving analog front end, the gain state including a set of configurations associated with a set of multiple amplifiers at the UE. The linearizer component 835 is capable of, configured to, or operable to support a means for linearizing the digital signal associated with the first transmission based on the gain state, where linearizing the digital signal includes obtaining an output voltage value corresponding to an input voltage value associated with the analog front end.

In some examples, to support linearizing the digital signal, the linearizer component 835 is capable of, configured to, or operable to support a means for obtaining the output voltage value corresponding to the input voltage value based on a first LUT of a set of LUTs, the first LUT being associated with the gain state.

In some examples, to support obtaining the input voltage value, the linearizer component 835 is capable of, configured to, or operable to support a means for obtaining the input voltage value from the first LUT based on an SNR associated with a noise figure corresponding to the digital signal.

In some examples, the frequency manager 855 is capable of, configured to, or operable to support a means for receiving a second message indicating a frequency domain allocation for the first transmission based on transmitting the first message, where the second message indicates the UE to linearize the digital signal.

In some examples, the capability component 825 is capable of, configured to, or operable to support a means for transmitting a third message indicating a capability to mitigate a blocking frequency band based on linearizing the digital signal.

In some examples, the frequency manager 855 is capable of, configured to, or operable to support a means for receiving a fourth message indicating a frequency domain allocation that is based on the third message, where the frequency domain allocation indicates at least one frequency band adjacent to the blocking frequency band.

In some examples, linearizing the digital signal is based on detecting that a change in temperature exceeds a threshold value. In some examples, linearizing the digital signal is based on detecting a change in the gain state, and where the receiving analog front end includes the set of multiple amplifiers at the UE. In some examples, linearizing the digital signal is based on detecting a change in an SNR associated with the digital signal, and where the change in the SNR is based on a change in the gain state, a change in temperature, or both.

Additionally, or alternatively, the communications manager 820 may support wireless communications at a UE in accordance with examples as disclosed herein. The request component 840 is capable of, configured to, or operable to support a means for transmitting a request message to transmit a training signal with a transmit power that is below a threshold transmit power, the training signal associated with estimating one or more parameters for linearizing a digital signal outputted by a receiving analog front end of the UE. The training signal component 845 is capable of, configured to, or operable to support a means for transmitting the training signal with the transmit power based on transmitting the request message. The parameter component 850 is capable of, configured to, or operable to support a means for measuring the training signal to estimate the one or more parameters.

In some examples, the request component 840 is capable of, configured to, or operable to support a means for receiving, in response to the request message, a message indicating that the UE is allowed to transmit the training signal with the transmit power for one or more symbols, where the training signal is transmitted during the one or more symbols.

In some examples, to support estimating the one or more parameters, the training signal component 845 is capable of, configured to, or operable to support a means for generating a set of LUTs, each LUT of the set of LUTs corresponding to a gain state and including a set of multiple output voltage values corresponding to a set of multiple input voltage values associated with the analog front end.

In some examples, the linearizer component 835 is capable of, configured to, or operable to support a means for receiving a first transmission, the first transmission being associated with a first gain state including a set of configurations associated with a set of multiple amplifiers at the UE. In some examples, the linearizer component 835 is capable of, configured to, or operable to support a means for linearizing the digital signal associated with the first transmission based on the first gain state and a first LUT corresponding to the first gain state, where linearizing the digital signal includes obtaining an output voltage value from the first LUT corresponding to an input voltage value associated with the analog front end.

In some examples, the parameter component 850 is capable of, configured to, or operable to support a means for estimating an amplitude modulation (AM) to AM distortion, an AM to phase modulation (PM) distortion, or both. In some examples, the parameter component 850 is capable of, configured to, or operable to support a means for estimating a target gain value based on the AM to AM distortion, the AM to PM distortion, or both, where generating the set of LUTs is based on estimating the target gain value.

In some examples, the training signal is linear based on transmitting the training signal with the transmit power.

Figure 9:
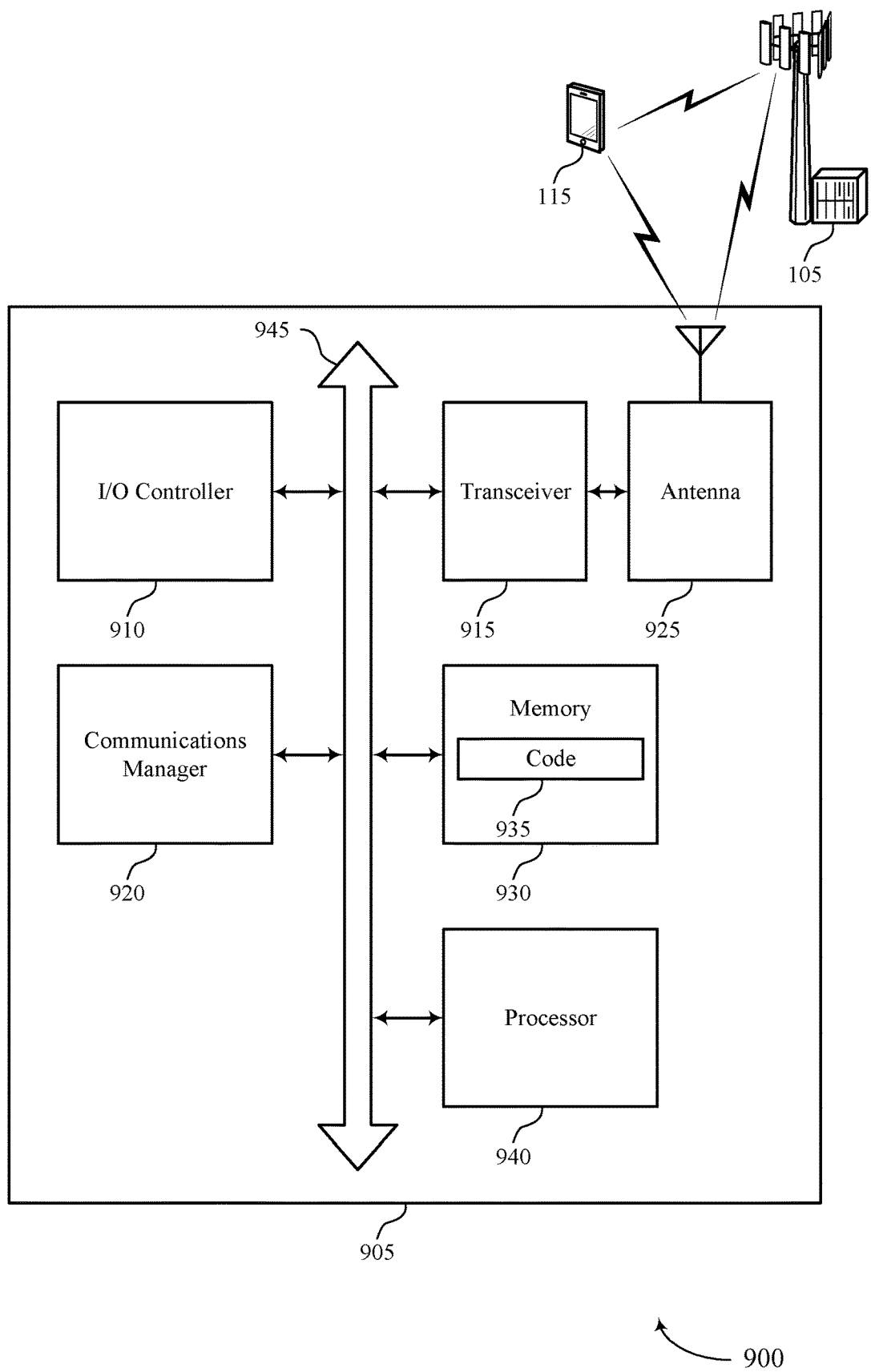
FIG. 9 shows a diagram of a system including a device that supports analog front end linearization in accordance with one or more aspects of the present disclosure.

FIG. 9 shows a diagram of a system 900 including a device 905 that supports analog front end linearization in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925.

The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting analog front end linearization). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communications at a UE in accordance with examples as disclosed herein. For example, the communications manager 920 is capable of, configured to, or operable to support a means for transmitting a first message indicating a capability to linearize a digital signal outputted by a receiving analog front end of the UE, the digital signal being associated with a first transmission. The communications manager 920 is capable of, configured to, or operable to support a means for receiving the first transmission, the first transmission being associated with a gain state of the receiving analog front end, the gain state including a set of configurations associated with a set of multiple amplifiers at the UE. The communications manager 920 is capable of, configured to, or operable to support a means for linearizing the digital signal associated with the first transmission based on the gain state, where linearizing the digital signal includes obtaining an output voltage value corresponding to an input voltage value associated with the analog front end.

Additionally, or alternatively, the communications manager 920 may support wireless communications at a UE in accordance with examples as disclosed herein. For example, the communications manager 920 is capable of, configured to, or operable to support a means for transmitting a request message to transmit a training signal with a transmit power that is below a threshold transmit power, the training signal associated with estimating one or more parameters for linearizing a digital signal outputted by a receiving analog front end of the UE. The communications manager 920 is capable of, configured to, or operable to support a means for transmitting the training signal with the transmit power based on transmitting the request message. The communications manager 920 is capable of, configured to, or operable to support a means for measuring the training signal to estimate the one or more parameters.

By including or configuring the communications manager 920 in accordance with examples as described herein, the device 905 may support techniques for analog front end linearization that may lead to improved communication reliability, reduced power consumption, longer battery life, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of analog front end linearization as described herein, or the at least one processor 940 and the at least one memory 930 may be otherwise configured to, individually or collectively, perform or support such operations.

Figure 10:
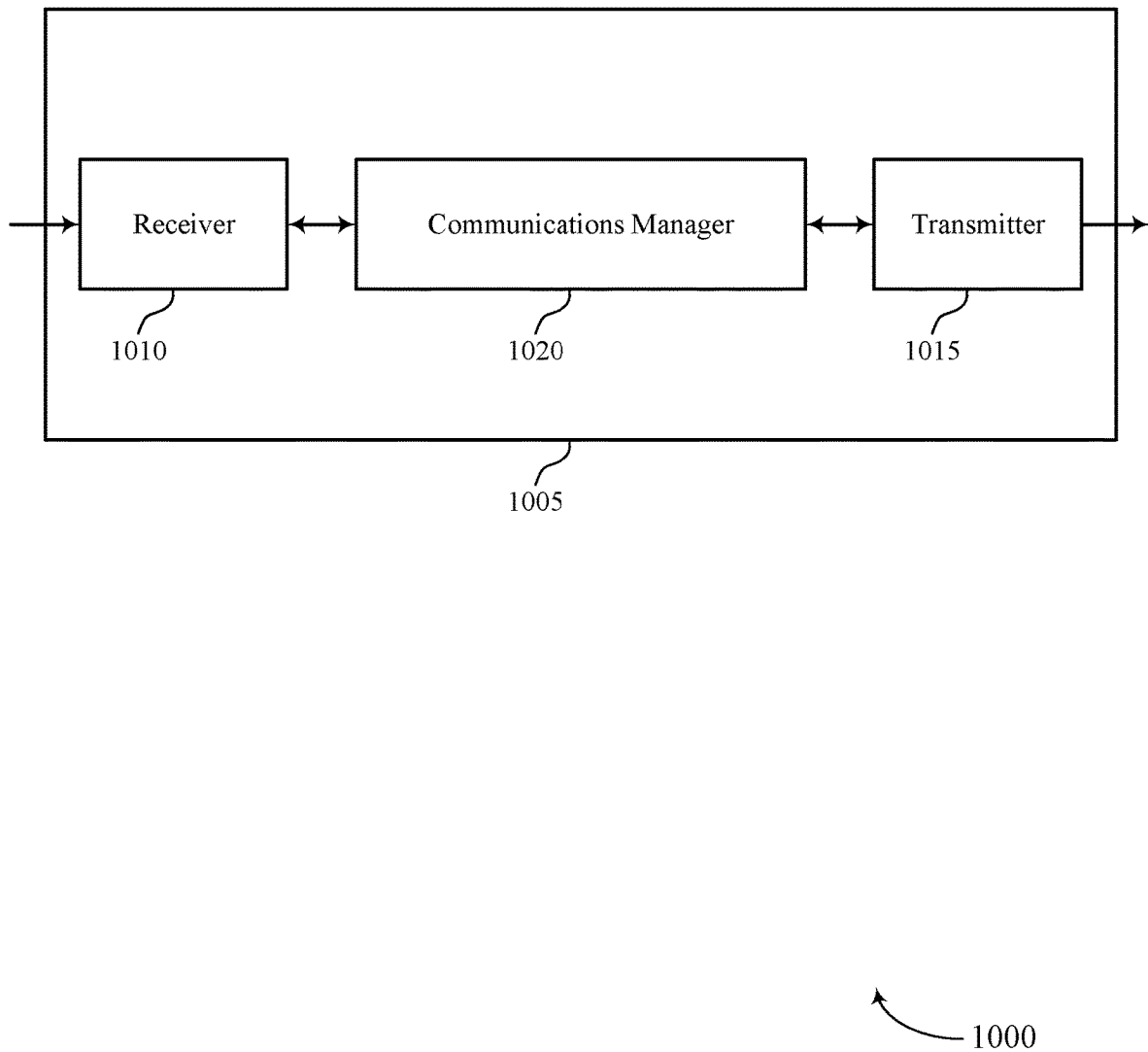
FIGS. 10 and 11 show block diagrams of devices that support analog front end linearization in accordance with one or more aspects of the present disclosure.

FIG. 10 shows a block diagram 1000 of a device 1005 that supports analog front end linearization in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of analog front end linearization as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 is capable of, configured to, or operable to support a means for receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The communications manager 1020 is capable of, configured to, or operable to support a means for transmitting a second message indicating a frequency domain allocation for the first transmission based on receiving the first message, where the second message indicates the UE to linearize the digital signal.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for analog front end linearization that may lead to reduced power consumption, enhanced reception quality, and more efficient scheduling procedures.

Figure 11:
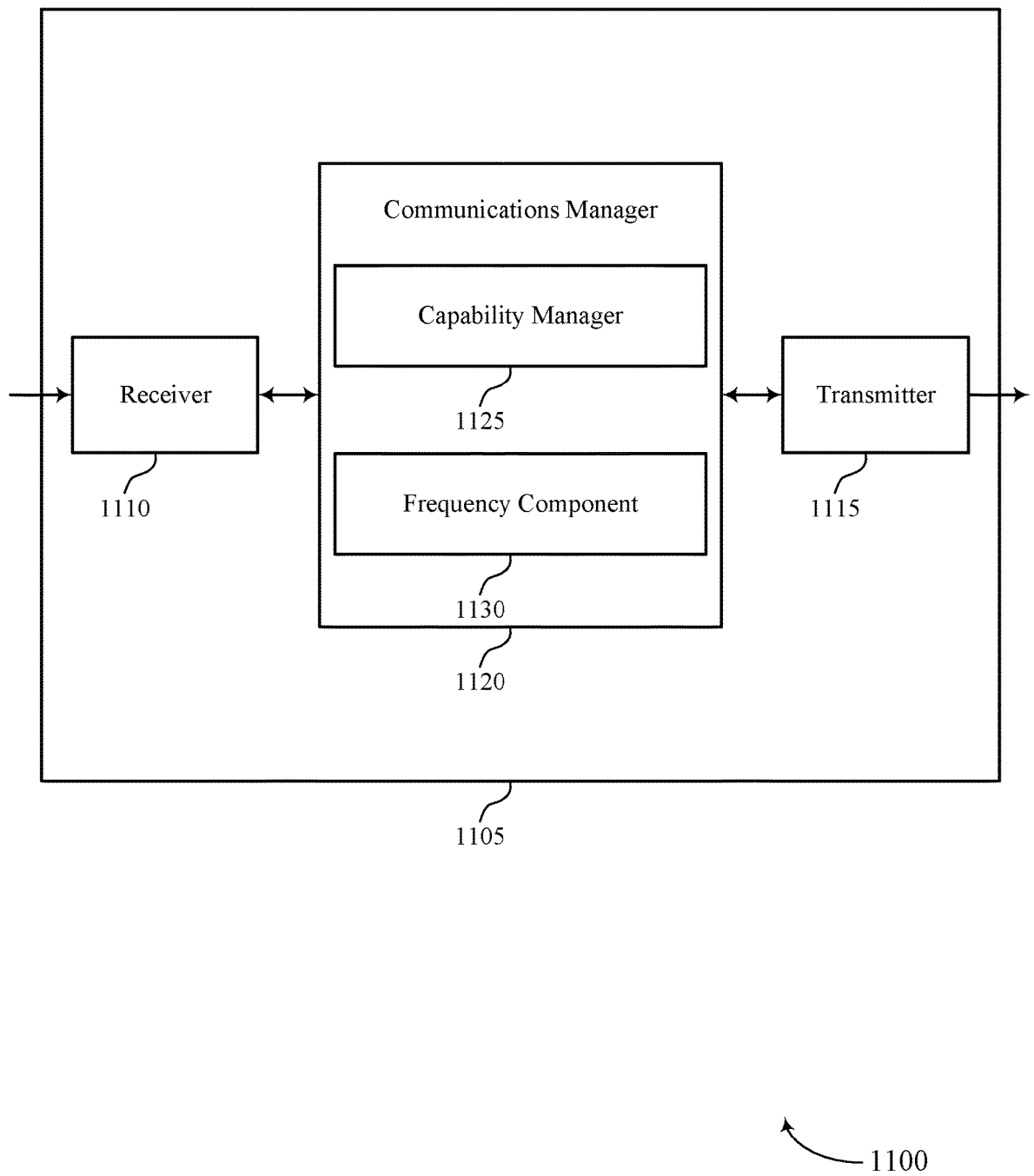

FIG. 11 shows a block diagram 1100 of a device 1105 that supports analog front end linearization in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of analog front end linearization as described herein. For example, the communications manager 1120 may include a capability manager 1125 a frequency component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The capability manager 1125 is capable of, configured to, or operable to support a means for receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The frequency component 1130 is capable of, configured to, or operable to support a means for transmitting a second message indicating a frequency domain allocation for the first transmission based on receiving the first message, where the second message indicates the UE to linearize the digital signal.

Figure 12:
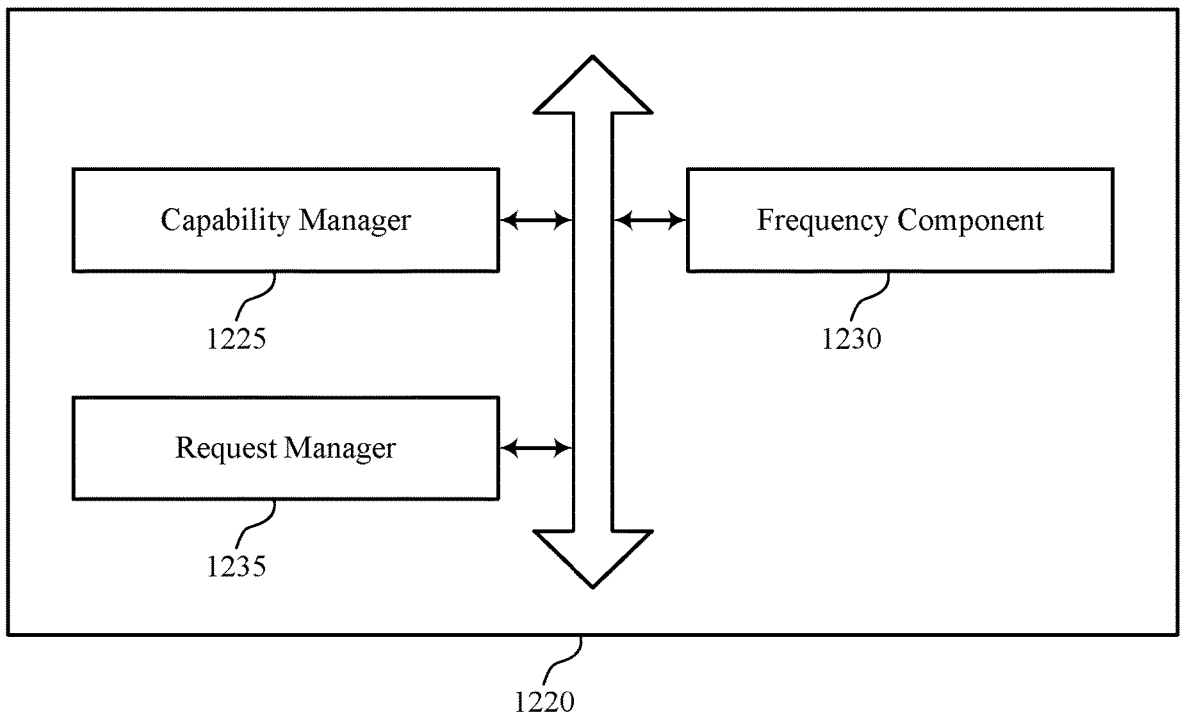
FIG. 12 shows a block diagram of a communications manager that supports analog front end linearization in accordance with one or more aspects of the present disclosure.

FIG. 12 shows a block diagram 1200 of a communications manager 1220 that supports analog front end linearization in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of analog front end linearization as described herein. For example, the communications manager 1220 may include a capability manager 1225, a frequency component 1230, a request manager 1235, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The capability manager 1225 is capable of, configured to, or operable to support a means for receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The frequency component 1230 is capable of, configured to, or operable to support a means for transmitting a second message indicating a frequency domain allocation for the first transmission based on receiving the first message, where the second message indicates the UE to linearize the digital signal.

In some examples, receiving a third message indicating a capability to mitigate a blocking frequency band based on linearizing the digital signal.

In some examples, the frequency domain allocation indicates at least one frequency band adjacent to the blocking frequency band based on receiving the third message.

In some examples, the request manager 1235 is capable of, configured to, or operable to support a means for receiving a request message to transmit a training signal with a transmit power that is below a threshold transmit power, the training signal associated with estimating one or more parameters for linearizing a digital signal outputted by a receiving analog front end of the UE. In some examples, the request manager 1235 is capable of, configured to, or operable to support a means for transmitting, in response to the request message, a message indicating that the UE is allowed to transmit the training signal with the transmit power for one or more symbols.

In some examples, the one or more parameters include an amplitude modulation (AM) to AM distortion, an AM to phase modulation (PM) distortion, a target gain value associated with an analog-to-digital converter of the UE, or any combination thereof.

In some examples, the second message indicates the UE to linearize the digital signal is based on detecting that a change in temperature at the UE exceeds a threshold value.

In some examples, the second message indicates the UE to linearize the digital signal is based on detecting a change in a gain state, the gain state associated with a set of multiple amplifiers at the UE.

In some examples, the second message indicates the UE to linearize the digital signal is based on detecting a change in an SNR associated with the digital signal, and where the change in the SNR is based on a change in the gain state, a change in temperature, or both.

Figure 13:
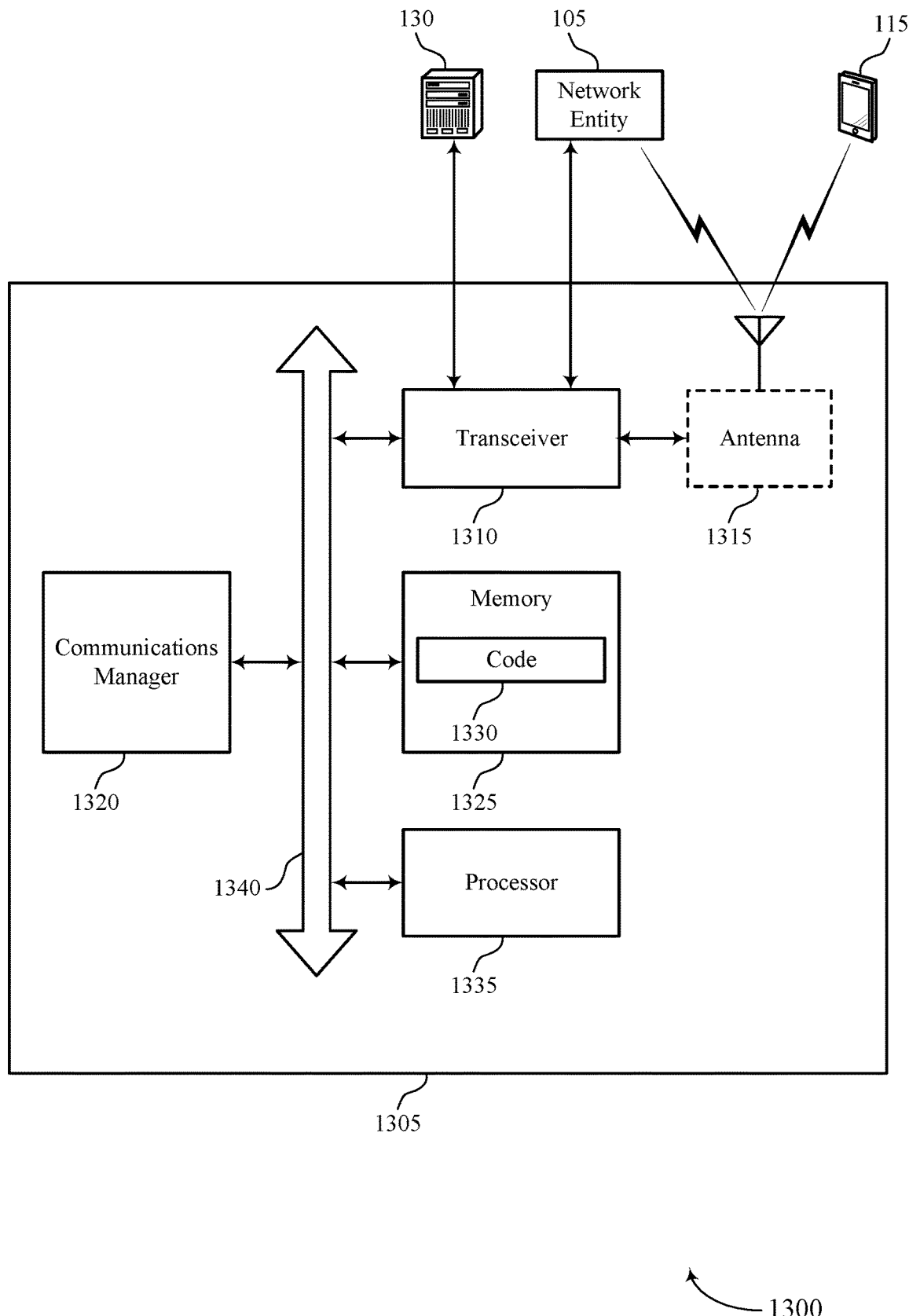
FIG. 13 shows a diagram of a system including a device that supports analog front end linearization in accordance with one or more aspects of the present disclosure.

FIG. 13 shows a diagram of a system 1300 including a device 1305 that supports analog front end linearization in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting analog front end linearization). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some implementations, the at least one processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the at least one processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 is capable of, configured to, or operable to support a means for receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The communications manager 1320 is capable of, configured to, or operable to support a means for transmitting a second message indicating a frequency domain allocation for the first transmission based on receiving the first message, where the second message indicates the UE to linearize the digital signal.

By including or configuring the communications manager 1320 in accordance with examples as described herein, the device 1305 may support techniques for analog front end linearization that may lead to improved communication reliability, reduced power consumption, and longer battery life.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of analog front end linearization as described herein, or the at least one processor 1335 and the at least one memory 1325 may be otherwise configured to, individually or collectively, perform or support such operations.

Figure 14:
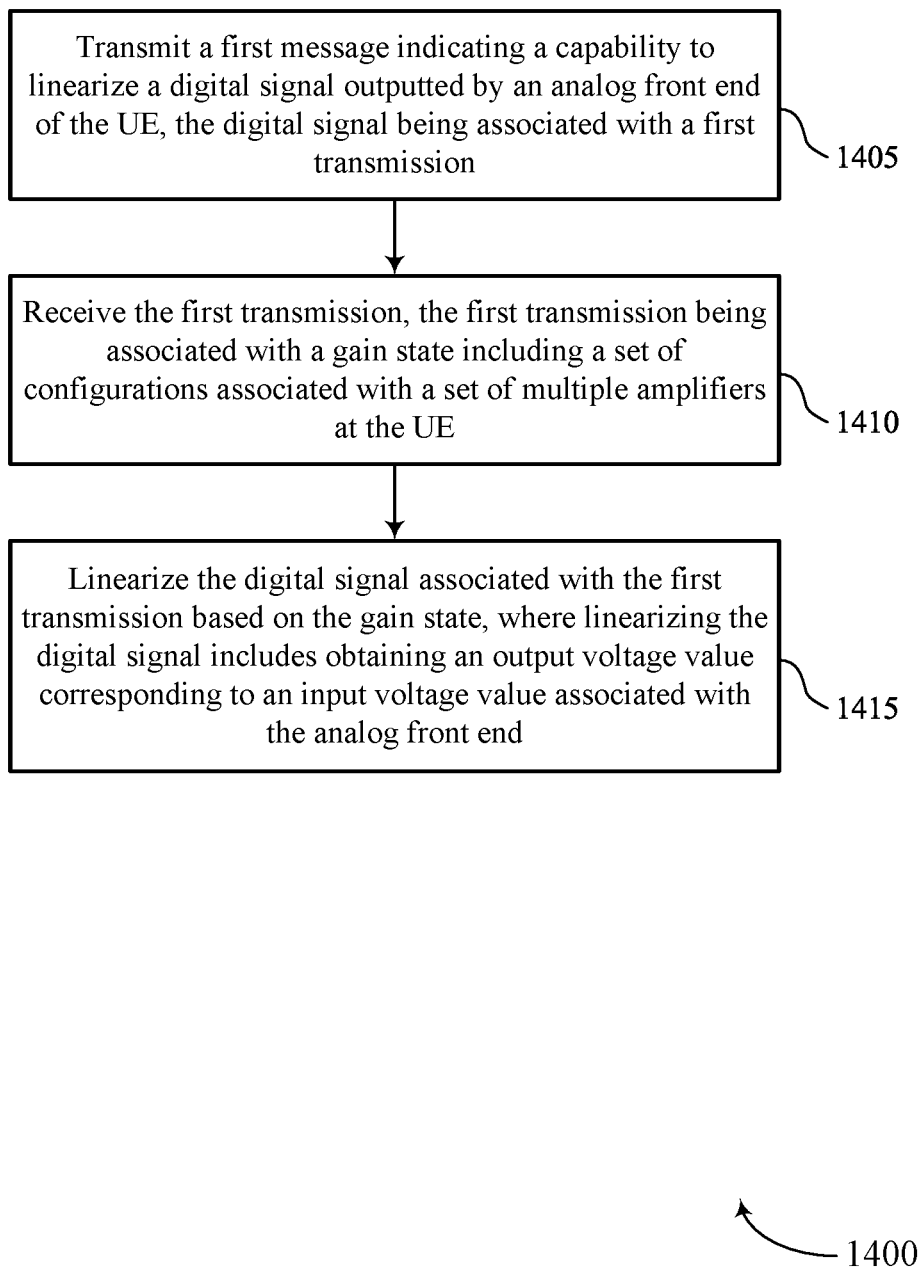
FIGS. 14 through 19 show flowcharts illustrating methods that support analog front end linearization in accordance with one or more aspects of the present disclosure.

FIG. 14 shows a flowchart illustrating a method 1400 that supports analog front end linearization in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions.

Additionally, or alternatively, the UE may perform aspects of the described functions using special-purpose hardware.

At 1405, the method may include transmitting a first message indicating a capability to linearize a digital signal outputted by a receiving analog front end of the UE, the digital signal being associated with a first transmission. The operations of block 1405 may be performed in accordance with examples as disclosed herein, such as regarding the transmission of the capability indication 215 as described with reference to FIG. 2. In some examples, aspects of the operations of 1405 may be performed by a capability component 825 as described with reference to FIG. 8.

At 1410, the method may include receiving the first transmission, the first transmission being associated with a gain state of the receiving analog front end, the gain state including a set of configurations associated with a set of multiple amplifiers at the UE. The operations of block 1410 may be performed in accordance with examples as disclosed herein. In some examples, aspects of the operations of 1410 may be performed by a gain state component 830 as described with reference to FIG. 8.

At 1415, the method may include linearizing the digital signal associated with the first transmission based on the gain state, where linearizing the digital signal includes obtaining an output voltage value corresponding to an input voltage value associated with the analog front end. The operations of block 1415 may be performed in accordance with examples as disclosed herein, such as described with reference to the linearizer 210 of FIG. 2 or the linearizer 335 of FIG. 3. In some examples, aspects of the operations of 1415 may be performed by a linearizer component 835 as described with reference to FIG. 8.

Figure 15:
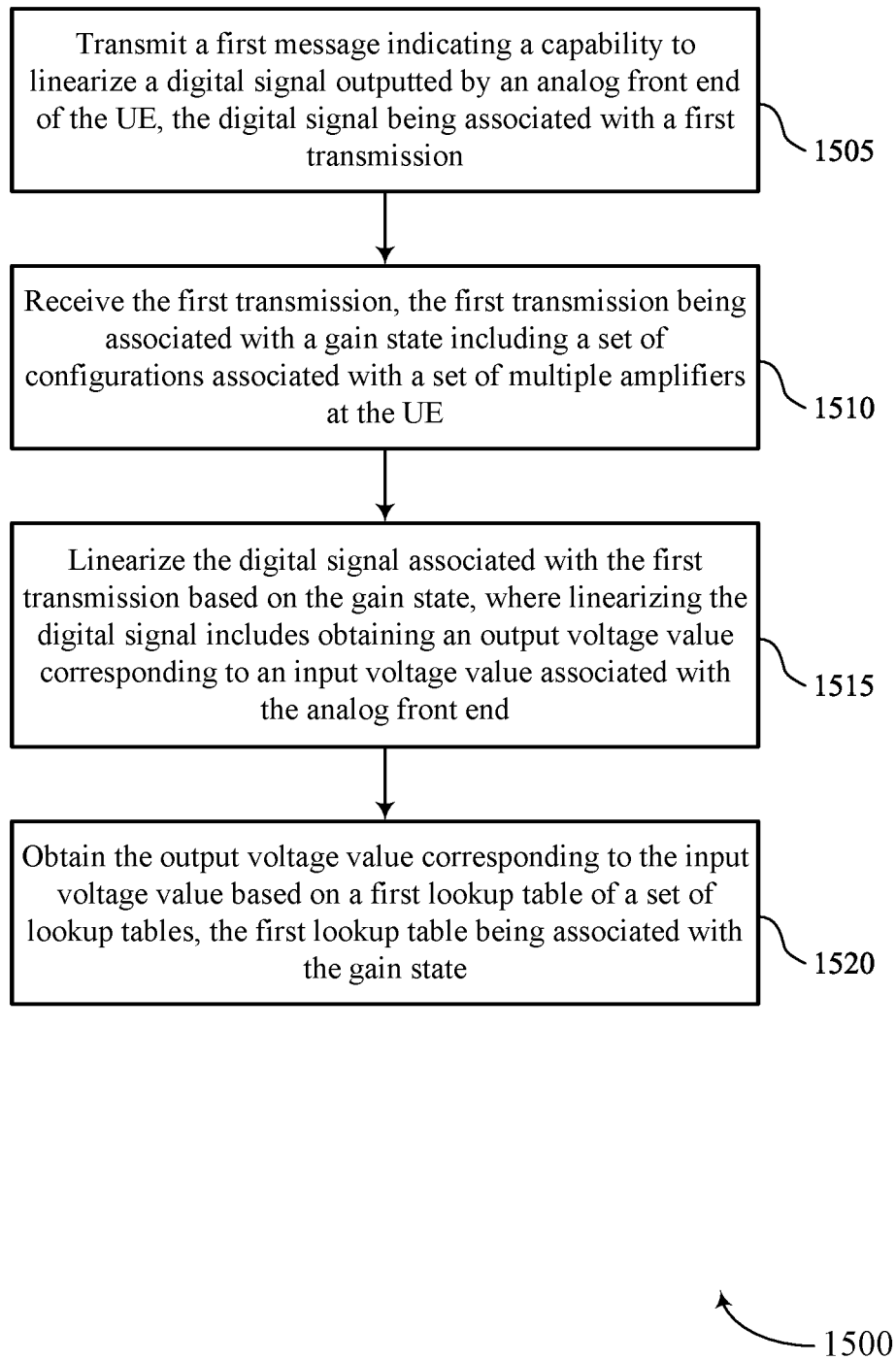

FIG. 15 shows a flowchart illustrating a method 1500 that supports analog front end linearization in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a first message indicating a capability to linearize a digital signal outputted by a receiving analog front end of the UE, the digital signal being associated with a first transmission. The operations of block 1505 may be performed in accordance with examples as disclosed herein, such as regarding the transmission of the capability indication 215 as described with reference to FIG. 2. In some examples, aspects of the operations of 1505 may be performed by a capability component 825 as described with reference to FIG. 8.

At 1510, the method may include receiving the first transmission, the first transmission being associated with a gain state of the receiving analog front end, the gain state including a set of configurations associated with a set of multiple amplifiers at the UE. The operations of block 1510 may be performed in accordance with examples as disclosed herein, such as with respect to the transmission 220 as described with reference to FIG. 2. In some examples, aspects of the operations of 1510 may be performed by a gain state component 830 as described with reference to FIG. 8.

At 1515, the method may include linearizing the digital signal associated with the first transmission based on the gain state, where linearizing the digital signal includes obtaining an output voltage value corresponding to an input voltage value associated with the analog front end. The operations of block 1515 may be performed in accordance with examples as disclosed herein, such as described with reference to the linearizer 210 of FIG. 2 or the linearizer 335 of FIG. 3. In some examples, aspects of the operations of 1515 may be performed by a linearizer component 835 as described with reference to FIG. 8.

At 1520, the method may include obtaining the output voltage value corresponding to the input voltage value based on a first LUT of a set of LUTs, the first LUT being associated with the gain state. The operations of block 1520 may be performed in accordance with examples as disclosed herein, such as described with reference to the linearizer 210 of FIG. 2 or the linearizer 335 of FIG. 3. In some examples, aspects of the operations of 1520 may be performed by a linearizer component 835 as described with reference to FIG. 8.

Figure 16:
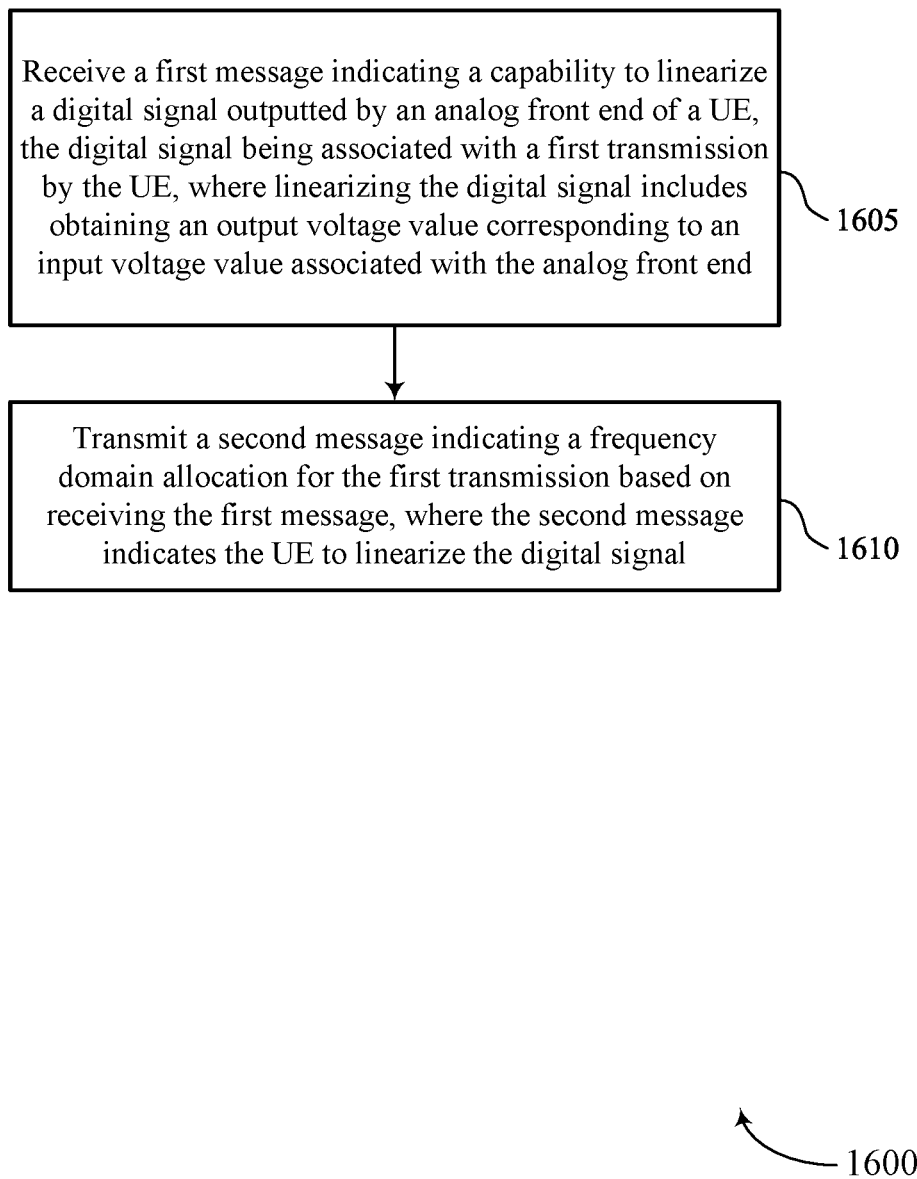

FIG. 16 shows a flowchart illustrating a method 1600 that supports analog front end linearization in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The operations of block 1605 may be performed in accordance with examples as disclosed herein, such as regarding the transmission of the capability indication 215 as described with reference to FIG. 2. In some examples, aspects of the operations of 1605 may be performed by a capability manager 1225 as described with reference to FIG. 12.

At 1610, the method may include transmitting a second message indicating a frequency domain allocation for the first transmission based on receiving the first message, where the second message indicates the UE to linearize the digital signal. The operations of block 1610 may be performed in accordance with examples as disclosed herein, such as regarding the transmission of the frequency allocation as described with reference to FIG. 5. In some examples, aspects of the operations of 1610 may be performed by a frequency component 1230 as described with reference to FIG. 12.

Figure 17:
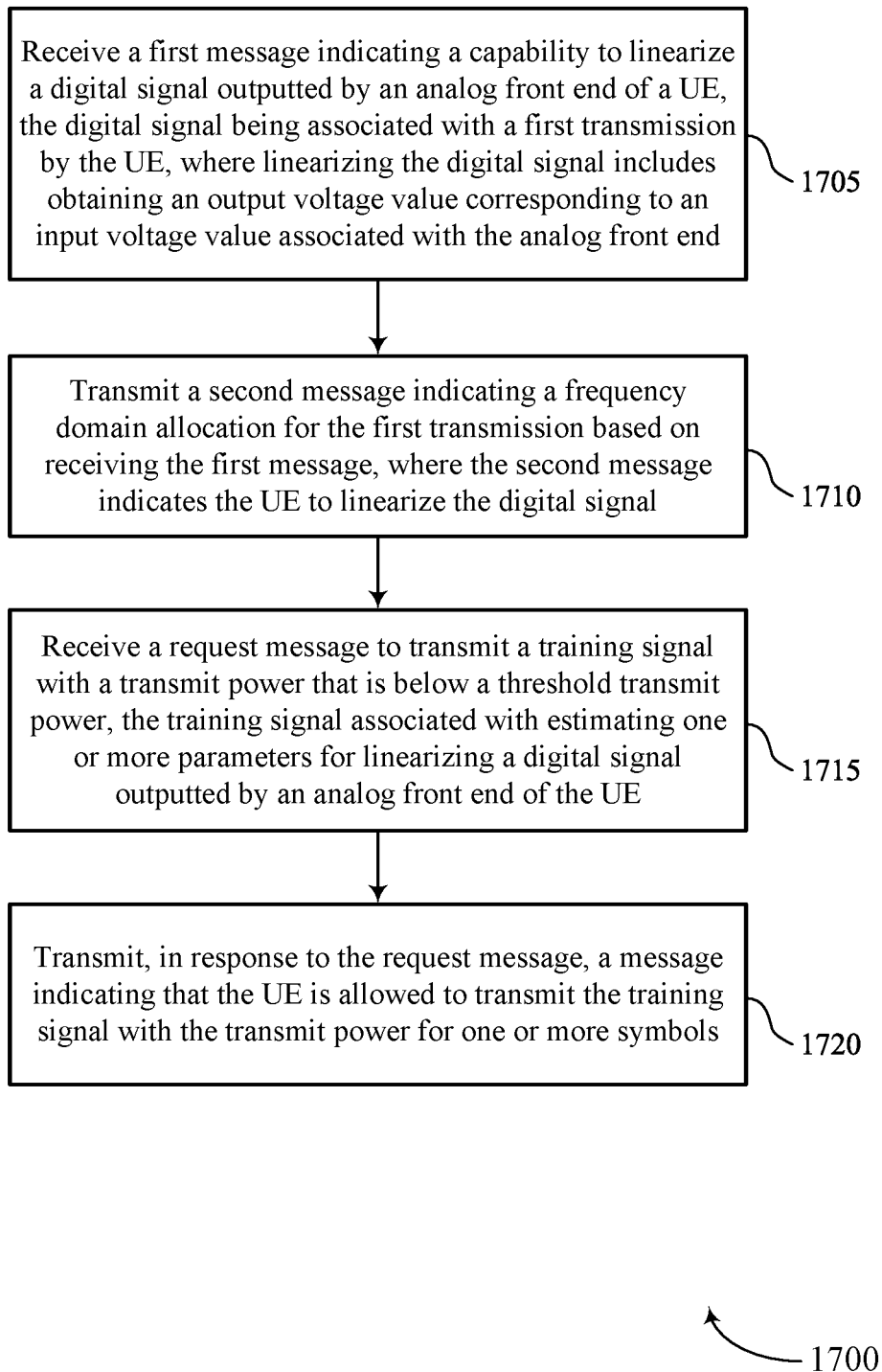

FIG. 17 shows a flowchart illustrating a method 1700 that supports analog front end linearization in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving a first message indicating a capability to linearize a digital signal outputted by a receiving analog front end of a UE, the digital signal being associated with a first transmission by the UE, where linearizing the digital signal includes obtaining an output voltage value corresponding to an input voltage value associated with the analog front end. The operations of block 1705 may be performed in accordance with examples as disclosed herein, such as regarding the transmission of the capability indication 215 as described with reference to FIG. 2. In some examples, aspects of the operations of 1705 may be performed by a capability manager 1225 as described with reference to FIG. 12.

At 1710, the method may include transmitting a second message indicating a frequency domain allocation for the first transmission based on receiving the first message, where the second message indicates the UE to linearize the digital signal. The operations of block 1710 may be performed in accordance with examples as disclosed herein, such as regarding the transmission of the frequency allocation as described with reference to FIG. 5. In some examples, aspects of the operations of 1710 may be performed by a frequency component 1230 as described with reference to FIG. 12.

At 1715, the method may include receiving a request message to transmit a training signal with a transmit power that is below a threshold transmit power, the training signal associated with estimating one or more parameters for linearizing a digital signal outputted by a receiving analog front end of the UE. The operations of block 1715 may be performed in accordance with examples as disclosed herein, such as regarding the transmission of the request message 225 as described with reference to FIG. 2. In some examples, aspects of the operations of 1715 may be performed by a request manager 1235 as described with reference to FIG. 12.

At 1720, the method may include transmitting, in response to the request message, a message indicating that the UE is allowed to transmit the training signal with the transmit power for one or more symbols. The operations of block 1720 may be performed in accordance with examples as disclosed herein, such as regarding the transmission of the response message 230 as described with reference to FIG. 2. In some examples, aspects of the operations of 1720 may be performed by a request manager 1235 as described with reference to FIG. 12.

Figure 18:
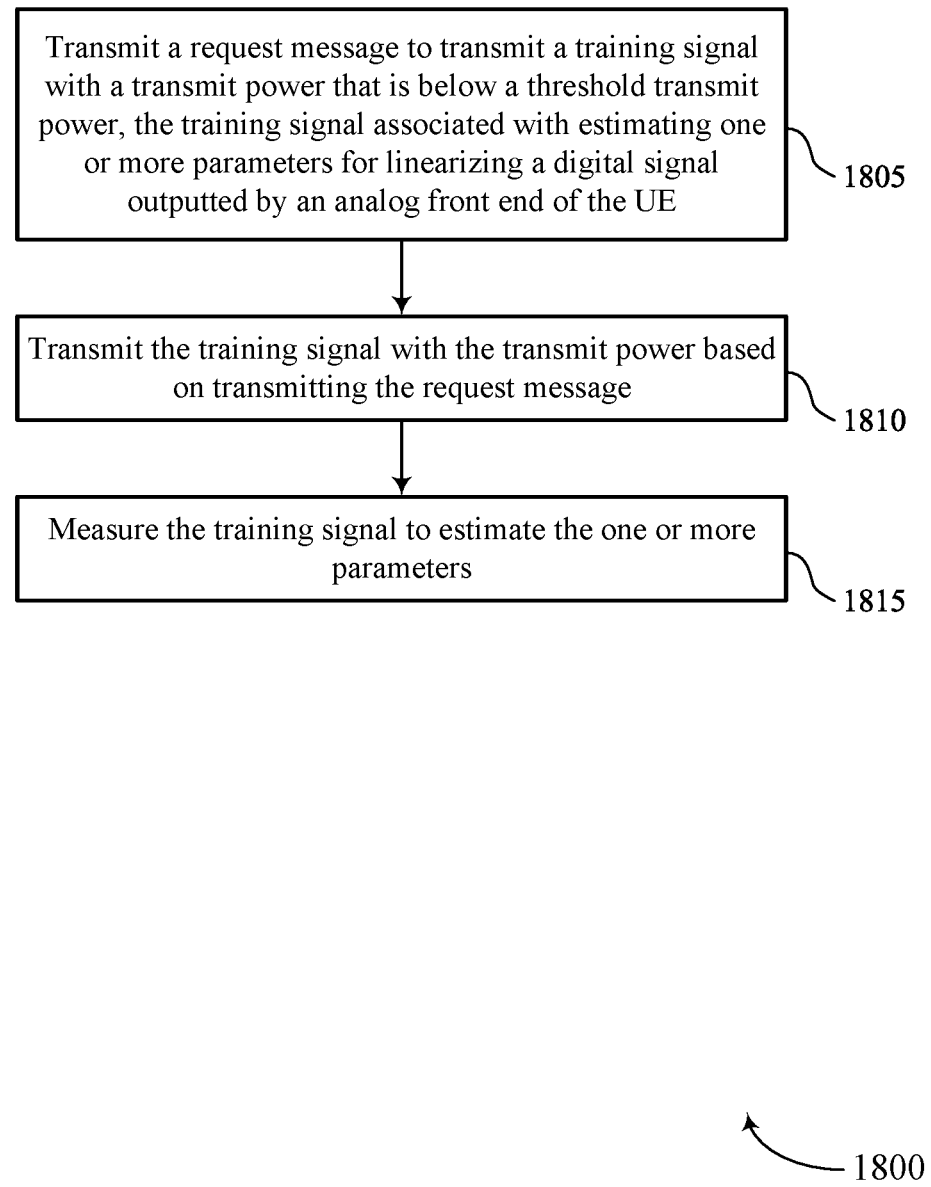

FIG. 18 shows a flowchart illustrating a method 1800 that supports analog front end linearization in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include transmitting a request message to transmit a training signal with a transmit power that is below a threshold transmit power, the training signal associated with estimating one or more parameters for linearizing a digital signal outputted by a receiving analog front end of the UE. The operations of block 1805 may be performed in accordance with examples as disclosed herein, such as regarding the transmission of the request message 225 as described with reference to FIG. 2. In some examples, aspects of the operations of 1805 may be performed by a request component 840 as described with reference to FIG. 8.

At 1810, the method may include transmitting the training signal with the transmit power based on transmitting the request message. The operations of block 1810 may be performed in accordance with examples as disclosed herein, with reference to the one or more training signals described in FIGS. 2, 3, and 5. In some examples, aspects of the operations of 1810 may be performed by a training signal component 845 as described with reference to FIG. 8.

At 1815, the method may include measuring the training signal to estimate the one or more parameters. The operations of block 1815 may be performed in accordance with examples as disclosed herein, with reference to the one or more training signals described in FIGS. 2, 3, and 5. In some examples, aspects of the operations of 1815 may be performed by a parameter component 850 as described with reference to FIG. 8.

Figure 19:
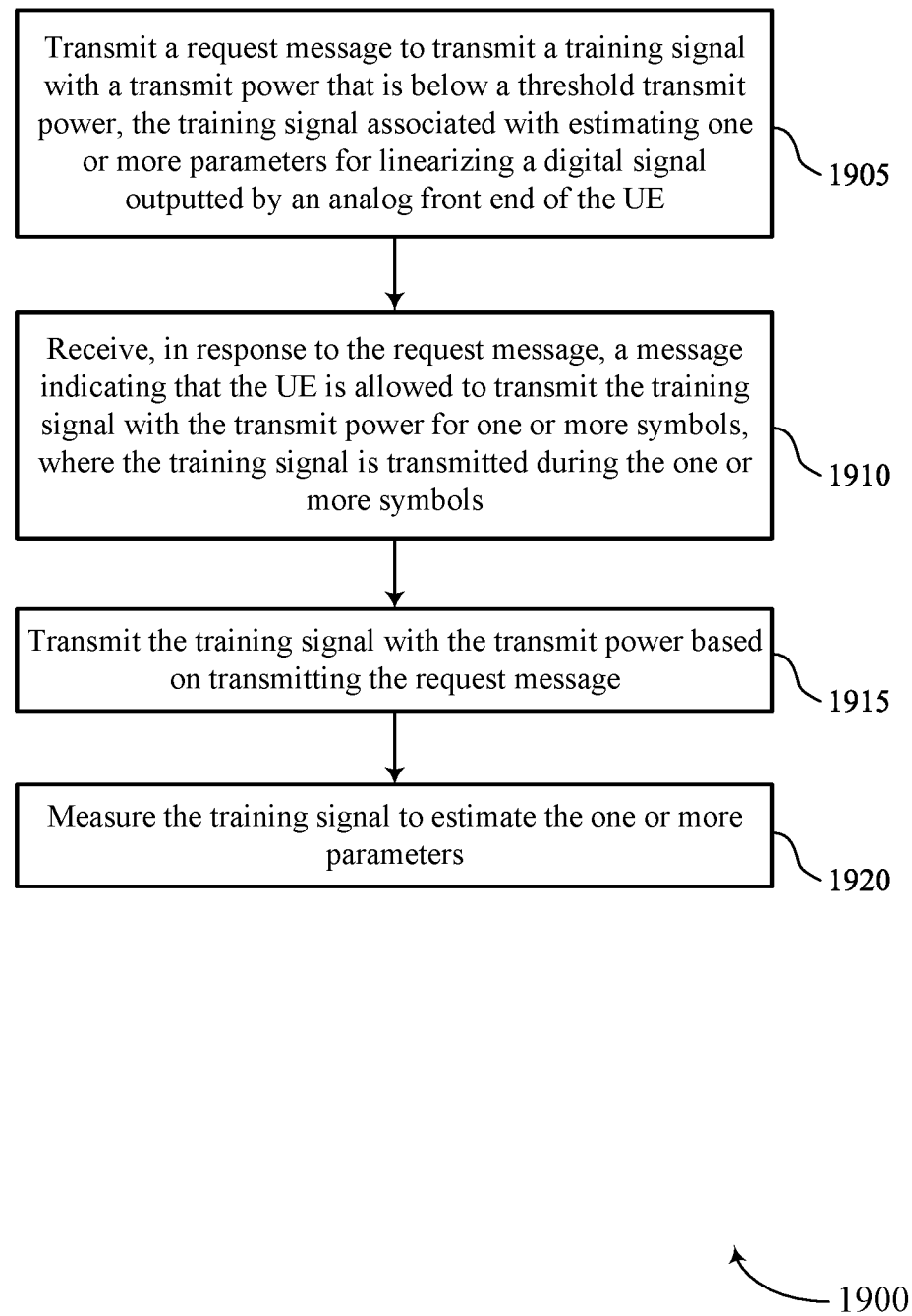

FIG. 19 shows a flowchart illustrating a method 1900 that supports analog front end linearization in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1905, the method may include transmitting a request message to transmit a training signal with a transmit power that is below a threshold transmit power, the training signal associated with estimating one or more parameters for linearizing a digital signal outputted by a receiving analog front end of the UE. The operations of block 1905 may be performed in accordance with examples as disclosed herein such as regarding the transmission of the request message 225 as described with reference to FIG. 2. In some examples, aspects of the operations of 1905 may be performed by a request component 840 as described with reference to FIG. 8.

At 1910, the method may include receiving, in response to the request message, a message indicating that the UE is allowed to transmit the training signal with the transmit power for one or more symbols, where the training signal is transmitted during the one or more symbols. The operations of block 1910 may be performed in accordance with examples as disclosed herein, such as regarding the transmission of the response message 230 as described with reference to FIG. 2. In some examples, aspects of the operations of 1920 may be performed by a request component 840 as described with reference to FIG. 8.

At 1915, the method may include transmitting the training signal with the transmit power based on transmitting the request message. The operations of block 1915 may be performed in accordance with examples as disclosed herein, with reference to the one or more training signals described in FIGS. 2, 3, and 5. In some examples, aspects of the operations of 1915 may be performed by a training signal component 845 as described with reference to FIG. 8.

At 1920, the method may include measuring the training signal to estimate the one or more parameters. The operations of block 1920 may be performed in accordance with examples as disclosed herein, with reference to the one or more training signals described in FIGS. 2, 3, and 5. In some examples, aspects of the operations of 1920 may be performed by a parameter component 850 as described with reference to FIG. 8.

The following provides an overview of aspects of the present disclosure:

Aspect 1: A method for wireless communications by a UE, comprising: transmitting a first message indicating a capability to linearize a digital signal outputted by a receiving analog front end of the UE, the digital signal being associated with a first transmission; receiving the first transmission, the first transmission being associated with a gain state of the receiving analog front end, the gain state comprising a set of configurations associated with a plurality of amplifiers at the UE; and linearizing the digital signal associated with the first transmission based at least in part on the gain state, wherein linearizing the digital signal comprises obtaining an output voltage value corresponding to an input voltage value associated with the receiving analog front end.

Aspect 2: The method of aspect 1, wherein linearizing the digital signal further comprises: obtaining the output voltage value corresponding to the input voltage value based at least in part on a first lookup table of a set of lookup tables, the first lookup table being associated with the gain state.

Aspect 3: The method of aspect 2, wherein obtaining the input voltage value further comprises: obtaining the input voltage value from the first lookup table based at least in part on a signal-to-noise ratio associated with a noise figure corresponding to the digital signal.

Aspect 4: The method of any of aspects 1 through 3, further comprising: receiving a second message indicating a frequency domain allocation for the first transmission based at least in part on transmitting the first message, wherein the second message indicates the UE to linearize the digital signal.

Aspect 5: The method of any of aspects 1 through 4, further comprising: transmitting a third message indicating a capability to mitigate a blocking frequency band based at least in part on linearizing the digital signal.

Aspect 6: The method of aspect 5, further comprising: receiving a fourth message indicating a frequency domain allocation that is based at least in part on the third message, wherein the frequency domain allocation indicates at least one frequency band adjacent to the blocking frequency band.

Aspect 7: The method of any of aspects 1 through 6, wherein linearizing the digital signal is based at least in part on detecting that a change in temperature exceeds a threshold value.

Aspect 8: The method of any of aspects 1 through 7, wherein linearizing the digital signal is based at least in part on detecting a change in the gain state, and the receiving analog front end comprises at least the plurality of amplifiers at the UE.

Aspect 9: The method of any of aspects 1 through 8, wherein linearizing the digital signal is based at least in part on detecting a change in a signal-to-noise ratio associated with the digital signal, and the change in the signal-to-noise ratio is based at least in part on a change in the gain state, a change in temperature, or both.

Aspect 10: A method for wireless communication at a network entity, comprising: receiving a first message indicating a capability to linearize a digital signal outputted by a receiving analog front end of a UE, the digital signal being associated with a first transmission by the UE, wherein linearizing the digital signal comprises obtaining an output voltage value corresponding to an input voltage value associated with the receiving analog front end; and transmitting a second message indicating a frequency domain allocation for the first transmission based at least in part on receiving the first message, wherein the second message indicates the UE to linearize the digital signal.

Aspect 11: The method of aspect 10, wherein receiving a third message indicating a capability to mitigate a blocking frequency band based at least in part on linearizing the digital signal.

Aspect 12: The method of aspect 11, wherein the frequency domain allocation indicates at least one frequency band adjacent to the blocking frequency band based at least in part on receiving the third message.

Aspect 13: The method of any of aspects 10 through 12, further comprising: receiving a request message to transmit a training signal with a transmit power that is below a threshold transmit power, the training signal associated with estimating one or more parameters for linearizing a digital signal outputted by the receiving analog front end of the UE; and transmitting, in response to the request message, a message indicating that the UE is allowed to transmit the training signal with the transmit power for one or more symbols.

Aspect 14: The method of aspect 13, wherein the one or more parameters comprise an amplitude modulation (AM) to AM distortion, an AM to phase modulation (PM) distortion, a target gain value associated with an analog-to-digital converter of the UE, or any combination thereof.

Aspect 15: The method of any of aspects 10 through 14, wherein the second message indicates the UE to linearize the digital signal is based at least in part on detecting that a change in temperature at the UE exceeds a threshold value.

Aspect 16: The method of any of aspects 10 through 15, wherein the second message indicates the UE to linearize the digital signal is based at least in part on detecting a change in a gain state of the receiving analog front end, the gain state comprising a set of configurations associated with a plurality of amplifiers at the UE, and the receiving analog front end comprises the plurality of amplifiers.

Aspect 17: The method of any of aspects 10 through 16, wherein the second message indicates the UE to linearize the digital signal is based at least in part on detecting a change in a signal-to-noise ratio associated with the digital signal, and the change in the signal-to-noise ratio is based at least in part on a change in a gain state, a change in temperature, or both.

Aspect 18: A method for wireless communications at a UE, comprising: transmitting a request message to transmit a training signal with a transmit power that is below a threshold transmit power, the training signal associated with estimating one or more parameters for linearizing a digital signal outputted by a receiving analog front end of the UE; transmitting the training signal with the transmit power based at least in part on transmitting the request message; and measuring the training signal to estimate the one or more parameters.

Aspect 19: The method of aspect 18, further comprising: receiving, in response to the request message, a message indicating that the UE is allowed to transmit the training signal with the transmit power for one or more symbols, wherein the training signal is transmitted during the one or more symbols.

Aspect 20: The method of any of aspects 18 through 19, wherein estimating the one or more parameters further comprises: generating a set of lookup tables, each lookup table of the set of lookup tables corresponding to a gain state and comprising a plurality of output voltage values corresponding to a plurality of input voltage values associated with the receiving analog front end.

Aspect 21: The method of aspect 20, further comprising: receiving a first transmission, the first transmission being associated with a first gain state comprising a set of configurations associated with a plurality of amplifiers at the UE; and linearizing the digital signal associated with the first transmission based at least in part on the first gain state and a first lookup table corresponding to the first gain state, wherein linearizing the digital signal comprises obtaining an output voltage value from the first lookup table corresponding to an input voltage value associated with the receiving analog front end.

Aspect 22: The method of any of aspects 20 through 21, further comprising: estimating an amplitude modulation (AM) to AM distortion, an AM to phase modulation (PM) distortion, or both; and estimating a target gain value based at least in part on the AM to AM distortion, the AM to PM distortion, or both, wherein generating the set of lookup tables is based at least in part on estimating the target gain value.

Aspect 23: The method of any of aspects 18 through 22, wherein the training signal is linear based at least in part on transmitting the training signal with the transmit power.

Aspect 24: A UE for wireless communications, comprising one or more memories; and one or more processors coupled with the one or more memories and individually or collectively configured to perform a method of any of aspects 1 through 9.

Aspect 25: A UE for wireless communications, comprising at least one means for performing a method of any of aspects 1 through 9.

Aspect 26: A non-transitory computer-readable medium storing code, the code comprising instructions executable by a processor to perform a method of any of aspects 1 through 9.

Aspect 27: A network entity for wireless communication, comprising one or more memories; and one or more processors coupled with the one or more memories and individually or collectively configured to perform a method of any of aspects 10 through 17.

Aspect 28: A network entity for wireless communication, comprising at least one means for performing a method of any of aspects 10 through 17.

Aspect 29: A non-transitory computer-readable medium storing code, the code comprising instructions executable by a processor to perform a method of any of aspects 10 through 17.

Aspect 30: A UE for wireless communications comprising one or more memories; and one or more processors coupled with the one or more memories and individually or collectively configured to perform a method of any of aspects 18 through 23.

Aspect 31: A UE for wireless communications, comprising at least one means for performing a method of any of aspects 18 through 23.

Aspect 32: A non-transitory computer-readable medium storing code, the code comprising instructions executable by a processor to perform a method of any of aspects 18 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
    one or more memories; and
    one or more processors coupled with the one or more memories and individually or collectively configured to:
        transmit a first message indicating a capability to linearize a digital signal outputted by a receiving analog front end of the UE, the digital signal being associated with a first transmission;
        receive the first transmission, the first transmission being associated with a gain state of the receiving analog front end, the gain state comprising a set of configurations associated with a plurality of amplifiers at the UE; and
        linearize the digital signal associated with the first transmission based at least in part on the gain state, wherein linearizing the digital signal comprises obtaining an output voltage value corresponding to an input voltage value associated with the receiving analog front end.

2. The UE of claim 1, wherein, to linearize the digital signal, the one or more processors are further configured to:
    obtain the output voltage value corresponding to the input voltage value based at least in part on a first lookup table of a set of lookup tables, the first lookup table being associated with the gain state.

3. The UE of claim 2, wherein, to obtain the input voltage value, the one or more processors are further configured to:

obtain the input voltage value from the first lookup table based at least in part on a signal-to-noise ratio associated with a noise figure corresponding to the digital signal.

4. The UE of claim 1, wherein the one or more processors are further configured to:
receive a second message indicating a frequency domain allocation for the first transmission based at least in part on transmitting the first message, wherein the second message indicates the UE to linearize the digital signal.

5. The UE of claim 1, wherein the one or more processors are further configured to:
transmit a third message indicating a capability to mitigate a blocking frequency band based at least in part on linearizing the digital signal.

6. The UE of claim 5, wherein the one or more processors are further configured to:
receive a fourth message indicating a frequency domain allocation that is based at least in part on the third message, wherein the frequency domain allocation indicates at least one frequency band adjacent to the blocking frequency band.

7. The UE of claim 1, wherein linearizing the digital signal is based at least in part on detecting that a change in temperature exceeds a threshold value.

8. The UE of claim 1, wherein linearizing the digital signal is based at least in part on detecting a change in the gain state, and wherein the receiving analog front end comprises at least the plurality of amplifiers at the UE.

9. The UE of claim 1, wherein linearizing the digital signal is based at least in part on detecting a change in a signal-to-noise ratio associated with the digital signal, and wherein the change in the signal-to-noise ratio is based at least in part on a change in the gain state, a change in temperature, or both.

10. A network entity for wireless communication, comprising:
one or more memories; and
one or more processors coupled with the one or more memories and individually or collectively configured to:
receive a first message indicating a capability to linearize a digital signal outputted by a receiving analog front end of a user equipment (UE), the digital signal being associated with a first transmission to the UE, wherein linearizing the digital signal comprises obtaining an output voltage value corresponding to an input voltage value associated with the receiving analog front end; and
transmit a second message indicating a frequency domain allocation for the first transmission based at least in part on receiving the first message, wherein the second message indicates the UE to linearize the digital signal.

11. The network entity of claim 10, wherein receiving a third message indicating a capability to mitigate a blocking frequency band based at least in part on linearizing the digital signal.

12. The network entity of claim 11, wherein the frequency domain allocation indicates at least one frequency band adjacent to the blocking frequency band based at least in part on receiving the third message.

13. The network entity of claim 10, wherein the one or more processors are further configured to:
receive a request message to transmit a training signal with a transmit power that is below a threshold transmit power, the training signal associated with estimating one or more parameters for linearizing a digital signal outputted by the receiving analog front end of the UE; and
transmit, based on receiving the request message, a message indicating that the UE is allowed to transmit the training signal with the transmit power for one or more symbols.

14. The network entity of claim 13, wherein the one or more parameters comprise an amplitude modulation (AM) to AM distortion, an AM to phase modulation (PM) distortion, a target gain value associated with an analog-to-digital converter of the UE, or any combination thereof.

15. The network entity of claim 10, wherein the second message indicates the UE to linearize the digital signal is based at least in part on detecting that a change in temperature at the UE exceeds a threshold value.

16. The network entity of claim 10, wherein the second message indicates the UE to linearize the digital signal is based at least in part on detecting a change in a gain state of the receiving analog front end, the gain state comprising a set of configurations associated with a plurality of amplifiers at the UE, and wherein the receiving analog front end comprises the plurality of amplifiers.

17. The network entity of claim 10, wherein the second message indicates the UE to linearize the digital signal is based at least in part on detecting a change in a signal-to-noise ratio associated with the digital signal, and wherein the change in the signal-to-noise ratio is based at least in part on a change in a gain state, a change in temperature, or both.

18. A user equipment (UE) for wireless communications, comprising:
one or more memories; and
one or more processors coupled with the one or more memories and individually or collectively configured to:
transmit a request message to transmit a training signal with a transmit power that is below a threshold transmit power, the training signal associated with estimating one or more parameters for linearizing a digital signal outputted by a receiving analog front end of the UE;
transmit the training signal with the transmit power based at least in part on transmitting the request message; and
measure the training signal to estimate the one or more parameters.

19. The UE of claim 18, wherein the one or more processors are further configured to:
receive, based on transmitting the request message, a message indicating that the UE is allowed to transmit the training signal with the transmit power for one or more symbols, wherein the training signal is transmitted during the one or more symbols.

20. The UE of claim 18, wherein, to estimate the one or more parameters, the one or more processors are further configured to:
generate a set of lookup tables, each lookup table of the set of lookup tables corresponding to a gain state and comprising a plurality of output voltage values corresponding to a plurality of input voltage values associated with the receiving analog front end.

21. The UE of claim 20, wherein the one or more processors are further configured to:
receive a first transmission, the first transmission being associated with a first gain state comprising a set of configurations associated with a plurality of amplifiers at the UE; and linearize the digital signal associated with the first transmission based at least in part on the first gain state and a first lookup table corresponding to the first gain state, wherein linearizing the digital signal comprises obtaining an output voltage value from the first lookup table corresponding to an input voltage value associated with the receiving analog front end.

22. The UE of claim 20, wherein the one or more processors are further configured to:
estimate an amplitude modulation (AM) to AM distortion, an AM to phase modulation (PM) distortion, or both; and
estimate a target gain value based at least in part on the AM to AM distortion, the AM to PM distortion, or both, wherein generating the set of lookup tables is based at least in part on estimating the target gain value.

23. The UE of claim 18, wherein the training signal is linear based at least in part on transmitting the training signal with the transmit power.

24. A method for wireless communications by a user equipment (UE), comprising:
transmitting a first message indicating a capability to linearize a digital signal outputted by a receiving analog front end of the UE, the digital signal being associated with a first transmission;
receiving the first transmission, the first transmission being associated with a gain state of the receiving analog front end comprising a set of configurations associated with a plurality of amplifiers at the UE; and
linearizing the digital signal associated with the first transmission based at least in part on the gain state, wherein linearizing the digital signal comprises obtaining an output voltage value corresponding to an input voltage value associated with the receiving analog front end.

25. The method of claim 24, wherein linearizing the digital signal further comprises:
obtaining the output voltage value corresponding to the input voltage value based at least in part on a first lookup table of a set of lookup tables, the first lookup table being associated with the gain state.

26. The method of claim 25, wherein obtaining the input voltage value further comprises:
obtaining the input voltage value from the first lookup table based at least in part on a signal-to-noise ratio associated with a noise figure corresponding to the digital signal.

27. The method of claim 24, further comprising:
receiving a second message indicating a frequency domain allocation for the first transmission based at least in part on transmitting the first message, wherein the second message indicates the UE to linearize the digital signal.

28. The method of claim 24, further comprising:
transmitting a third message indicating a capability to mitigate a blocking frequency band based at least in part on linearizing the digital signal.

29. The method of claim 28, further comprising:
receiving a fourth message indicating a frequency domain allocation that is based at least in part on the third message, wherein the frequency domain allocation indicates at least one frequency band adjacent to the blocking frequency band.

30. The method of claim 24, wherein linearizing the digital signal is based at least in part on detecting a change in the gain state, the gain state associated with the plurality of amplifiers at the UE.

\* \* \* \* \*